United States Patent [19]
Tahara et al.

[11] Patent Number: 5,856,048
[45] Date of Patent: Jan. 5, 1999

[54] INFORMATION-RECORDED MEDIA AND METHODS FOR READING THE INFORMATION

[75] Inventors: Shigehiko Tahara; Shinichi Kurokawa; Norio Takahashi; Ryuji Horiguchi; Morito Sakai; Akira Hayakawa; Shinpei Komaki, all of Tokyo, Japan

[73] Assignee: Dai Nippon Printing Co., Ltd., Tokyo, Japan

[21] Appl. No.: 97,765

[22] Filed: Jul. 26, 1993

[30] Foreign Application Priority Data

| Jul. 27, 1992 | [JP] | Japan | 4-199481 |
| Jul. 27, 1992 | [JP] | Japan | 4-199771 |
| Feb. 24, 1993 | [JP] | Japan | 5-058019 |
| Jun. 11, 1993 | [JP] | Japan | 5-140310 |

[51] Int. Cl.[6] .................. G03H 1/04; G03H 1/18
[52] U.S. Cl. .................. 430/1; 283/85; 283/86; 283/87; 283/88; 359/22; 359/25; 359/26; 359/29; 430/2
[58] Field of Search .................. 428/64, 195, 913, 428/914; 283/86, 85, 87, 88; 359/29, 2, 22, 25, 26; 430/1

[56] References Cited

U.S. PATENT DOCUMENTS

| 3,412,493 | 11/1968 | French | 283/85 |
| 4,234,214 | 11/1980 | Lee | 283/85 |
| 4,269,473 | 5/1981 | Flothmann et al. | 283/86 |
| 4,411,489 | 10/1983 | McGraw | 350/3.76 |
| 4,856,857 | 8/1989 | Takeuchi et al. | 350/36 |
| 4,913,990 | 4/1990 | Rallison | 430/30 |
| 4,959,283 | 9/1990 | Smothers et al. | 430/1 |
| 5,037,101 | 8/1991 | McNulty | 283/86 |
| 5,056,880 | 10/1991 | Barbanell | 359/29 |
| 5,138,604 | 8/1992 | Umeda et al. | 369/103 |
| 5,142,383 | 8/1992 | Mallik | 283/91 |
| 5,145,212 | 9/1992 | Mallik | 283/86 |
| 5,182,180 | 1/1993 | Gambogi, Jr. et al. | 430/1 |
| 5,297,132 | 3/1994 | Takano et al. | 369/284 |
| 5,310,222 | 5/1994 | Chatwin et al. | 283/86 |
| 5,351,142 | 9/1994 | Cueli | 359/2 |
| 5,401,346 | 3/1995 | Yin et al. | 156/233 |

*Primary Examiner*—Bruce H. Hess
*Attorney, Agent, or Firm*—Dellett and Walters

[57] ABSTRACT

The invention is directed to an information-recorded medium with easily selectable and identifiable items of information, which is virtually protected against forgery and has enhanced security against some improper use, and a method for reading such a medium. This information-recorded medium 1 includes a substrate 2 and a layer 3 with information recorded thereon by the printing of infrared absorbing ink, said layer 3 being provided on the surface of the layer 2. The printed layer 3 is provided thereon with a relief hologram-recorded layer 7 through an adhesive layer 4, said hologram-recorded layer 7 being built up of a reflecting layer 5 transparent to the infrared region and a relief hologram-formed layer 6 provided on the surface of the reflecting layer 5. For reading, the hologram-recorded layer 7 is reconstructed by visible light, while the printed layer is reconstructed by infrared light, and the medium 1 is identified on the basis of the thus reconstructed information.

22 Claims, 21 Drawing Sheets

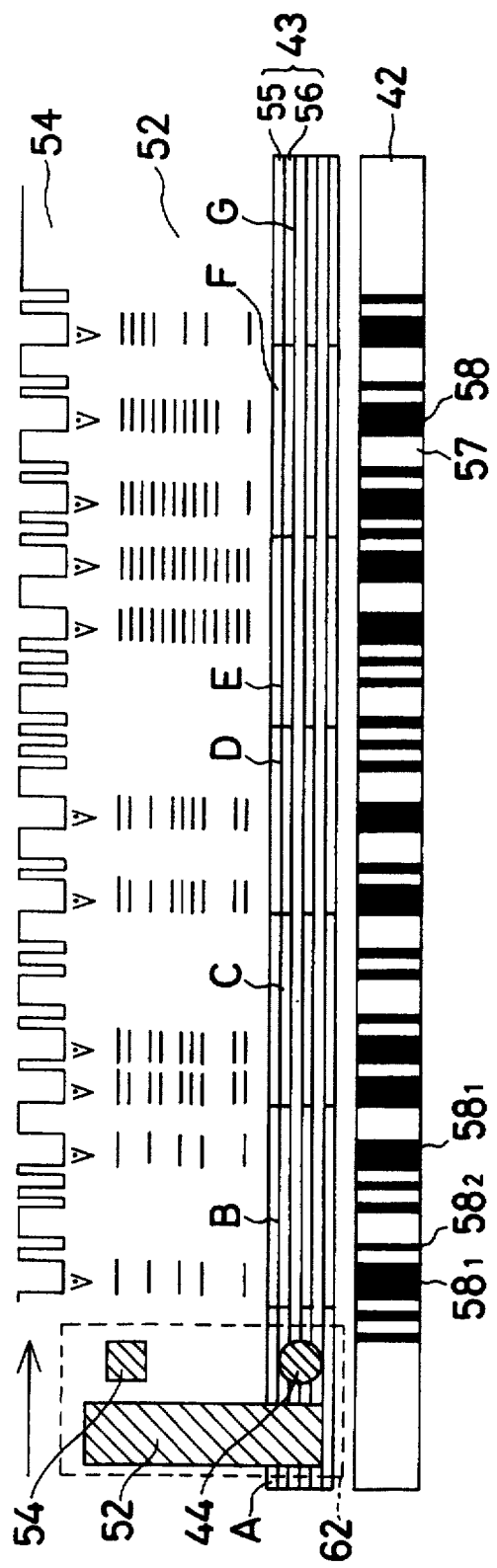

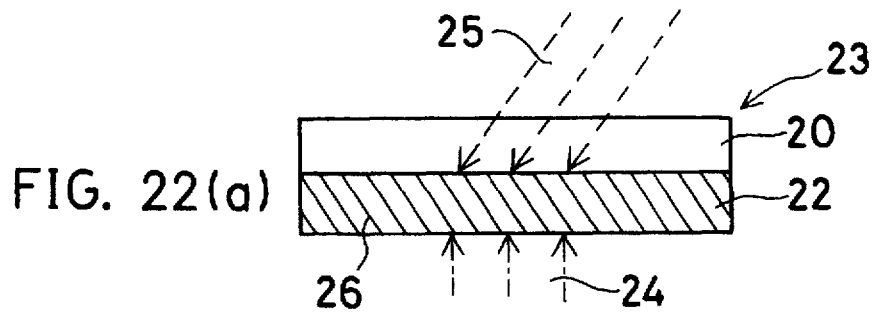
FIG. 22(a)
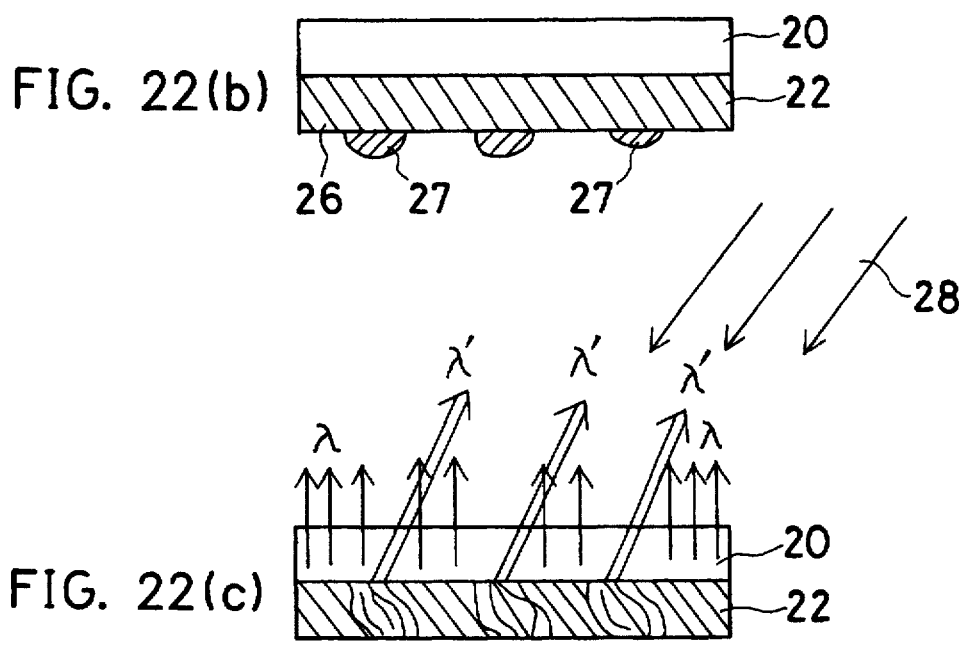
FIG. 22(b)
FIG. 22(c)
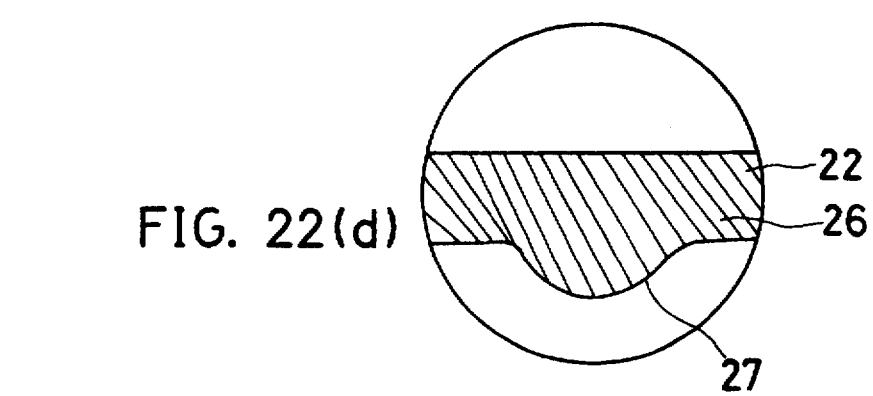
FIG. 22(d)

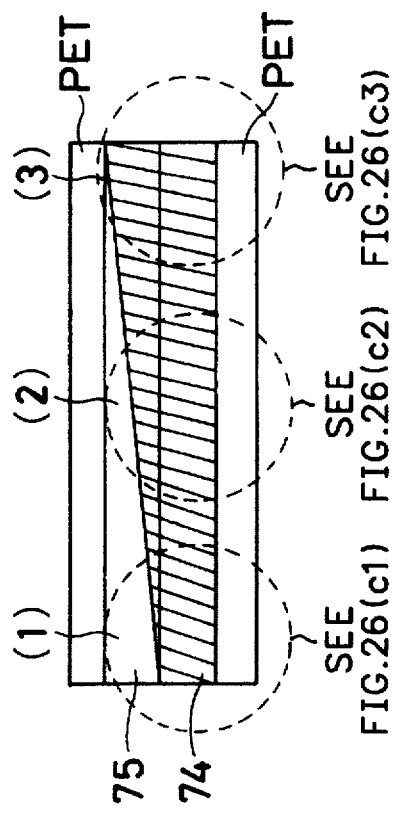
FIG. 26(a)
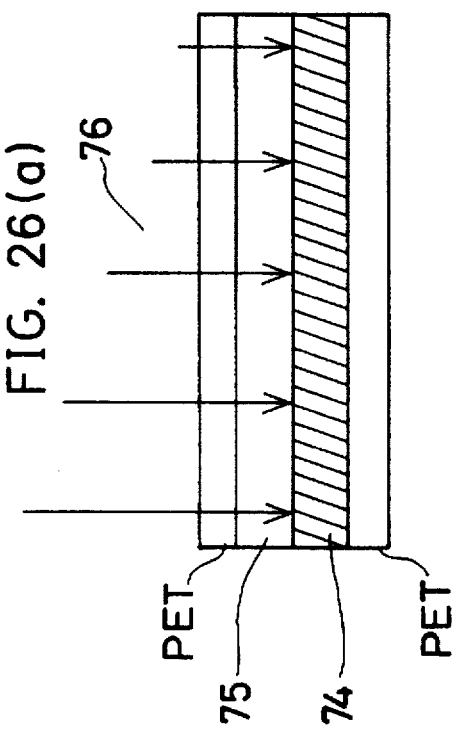
FIG. 26(b)
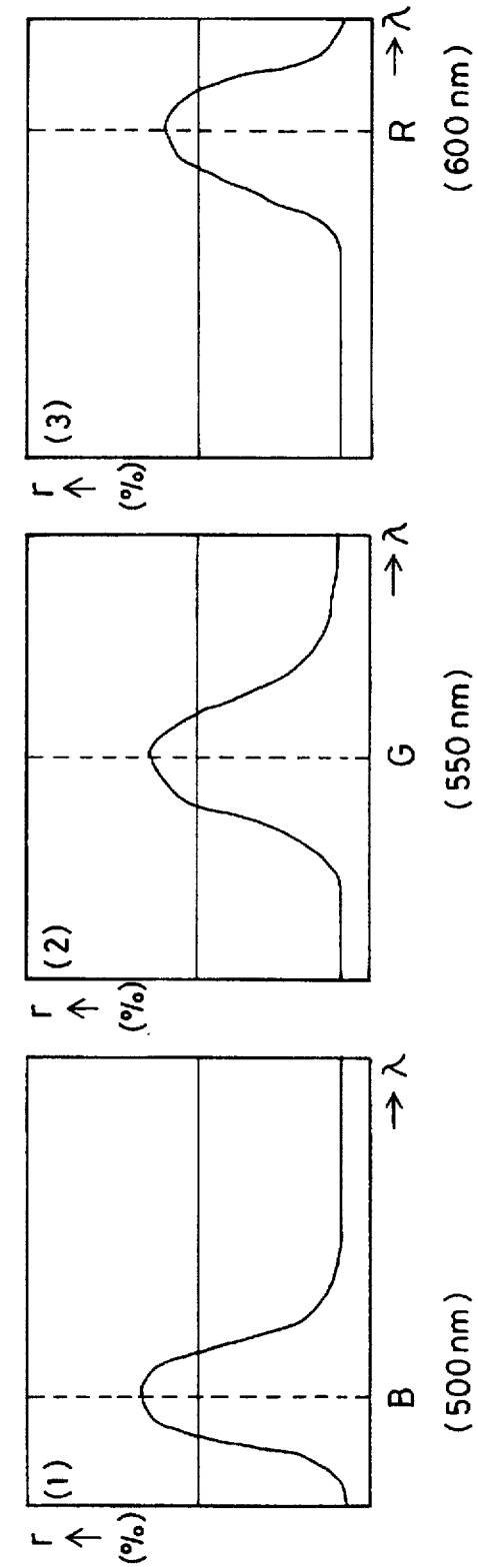
FIG. 26(c1)
FIG. 26(c2)
FIG. 26(c3)

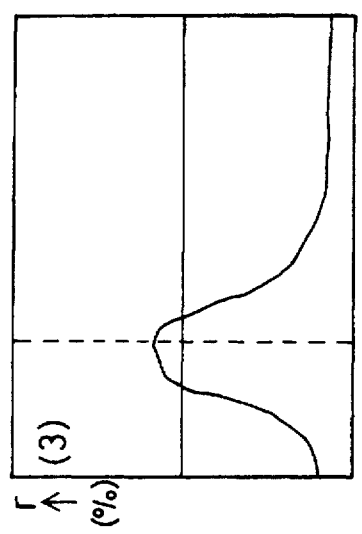
FIG. 28 (b1)
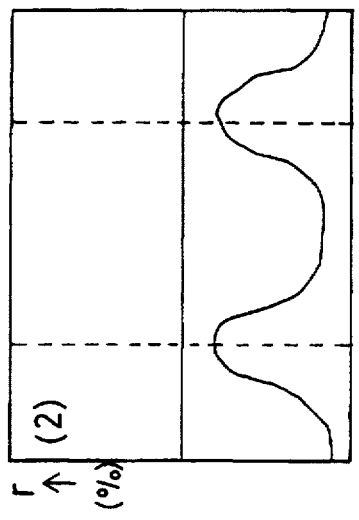
FIG. 28 (b2)
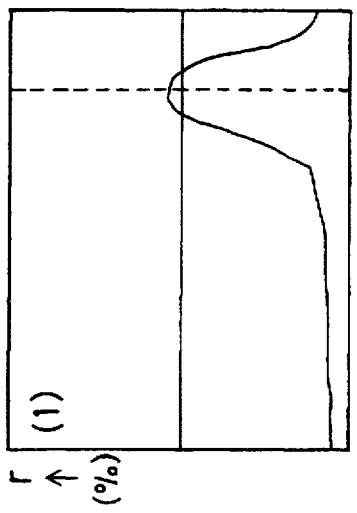
FIG. 28 (b3)
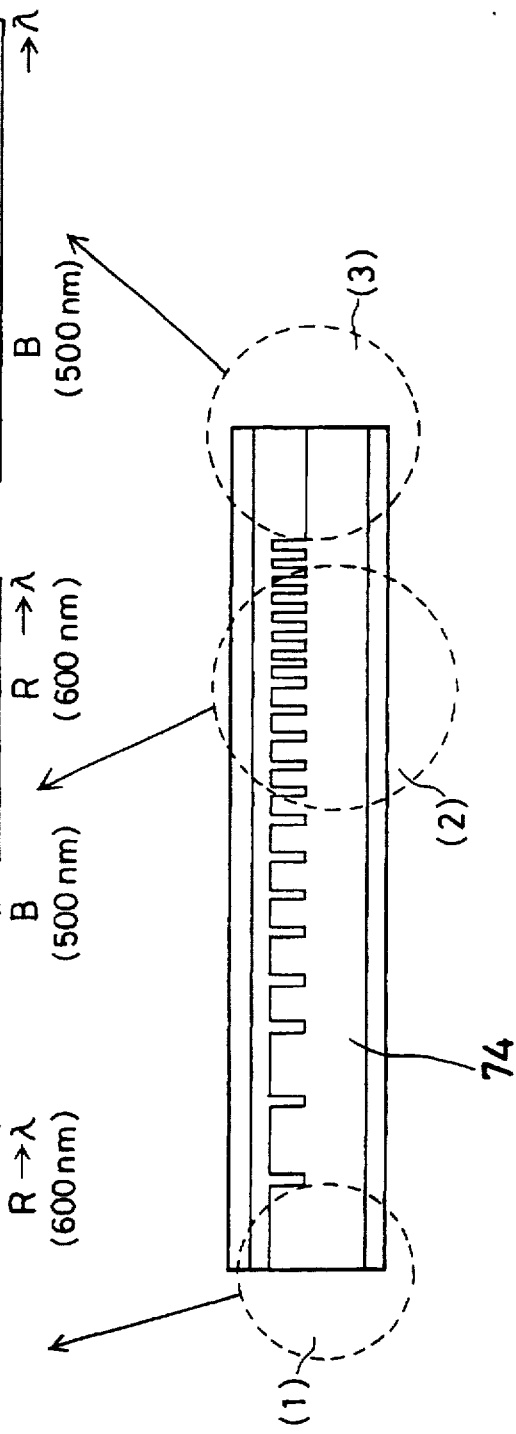
FIG. 28(a)

INFORMATION-RECORDED MEDIA AND METHODS FOR READING THE INFORMATION

BACKGROUND OF THE INVENTION

The present invention relates to a medium with information recorded on it (hereinafter called an information-recorded medium) and a method for reading the information. More particularly, the invention is directed to an information-recorded medium in card or other forms, which is virtually protected against an improper use, and a method for reading the information.

Information-recorded card media built up of a card substrate and a magnetic recording layer for recording information for identifying them have found wide application in the form of various cards such as ID cards, credit cards and bank cards.

A serious problem with currently available credit cards, bank cards, prepaid cards, securities, bank notes, passports, etc., are that they are easily forgeable, especially because it is relatively easy to overwrite or read the information on the magnetic layers, and so it has been proposed to laminate not-easy-to-produce holograms on the surfaces of cards for the purpose of preventing falsification. This is intended to prevent forgery by making use of the fact that holograms are not easy to produce and so the preparation of holograms themselves is costly. For instance, magnetic cards, when having hologram sheets thereon, can be visually shown not to be forgeries.

For another means for preventing the forgery of cards, etc., techniques for using magnetically recorded information in combination with otherwise recorded information, thereby judging whether they are true or not, have been proposed as well. According to one of these techniques, for instance, a magnetic recording layer with one information already recorded thereon is provided with another information in the form of a pattern composed of infrared absorbing and reflecting layers. That pattern is read due to a difference in the reflectivity with respect to infrared rays, thereby judging whether the card is true or not. According to this technique, the pattern composed of infrared absorbing and reflecting layers do not reflect visible light; the card has a very little chance of being forged, because the second information itself cannot easily be found, nor is it visible to the eye.

In a conventional information-recorded medium having a hologram laminated on the surface of a magnetic card substrate, however, it is general to identify the holographic information visually. Especially in the case of a reflection type hologram, the underlying layer of the hologram cannot be viewed from above: in other words, another information cannot be superimposed on that portion for recording.

When information other than holographic information is to be recorded on the magnetic recording layer while it is superimposed on the hologram, the amount of available information is limited, and card design becomes aesthetically poor. A grave problem with a conventional hologram is that it has still not a few chances of being forged, because it can be shown to be the very thing at the first glance, and moreover can be easily discerned in terms of in what form the information is recorded on the hologram. A serious problem when printable information and holographic information are recorded on the same region in a superimposed manner is that not only is it difficult to selectively separate one information from another for identification, but it is also difficult to identify each information with the use of a sensor, etc.

The combined use of magnetically recorded information and otherwise recorded information is not any essential solution to the problem, because the magnetically recorded information is still easy to forge.

In use, those cards are required to be identified as to they are genuine or not. For this purpose, hologram sheets have been laminated on the surfaces of the magnetic layers, as mentioned above. However, this is done to apply aesthetic effects to the cards, rather than to ensure that they can be identified due to the presence or absence of the holographic sheets. Therefore, if holograms—which have a problem with their production—are anyhow prepared and laminated on cards, there is then left a possibility that the cards may be easily forged by the overwriting of the magnetically recorded information. Thus, there is a strong demand for a card-identifying way of giving much higher security against some possible forgery or falsification.

SUMMARY OF THE INVENTION

In view of the above-mentioned problems with the prior art, an object of the invention is to provide an information-recorded medium with easily selectable and identifiable items of information, which is virtually forgery or falsification proof and ensures much improved security against some improper use, and to provide a method for reading the information.

According to invention, this and other objects are attained by the provision of a medium having information recorded thereon, which is made up of a first layer with a hologram recorded thereon and a second layer with information recorded thereon by printing, each of said layers bearing at least one item of information, said first and second layers being integrated with each other by means of lamination, and the upper one of said layers transmitting reconstruction light for the lower layer, so that the lower layer can be reconstructed without hindrance from the upper layer.

According to another aspect of the invention, there is provided a method for reading the information recorded on a medium, wherein said information-recorded medium is irradiated with light containing a wavelength at which a first layer with hologram recorded thereon is reconstructed and a wavelength at which a second layer with information recorded thereon by printing is reconstructed, a first detecting means is provided to detect a pattern diffracted by said first layer, and a second detecting means is provided to detect light reflected by the second layer, whereby the information recorded on the first layer and the information recorded on the second layer are separately read.

According to the third aspect of the invention, there is provided an information-recorded medium including a layer with information recorded thereon by printing, composed of a portion that reflects light regularly and a portion that is capable of absorbing or scattering light, wherein said printed layer is integrally provided on the surface side with a hologram layer having a transmission type of diffraction grating or hologram that diffracts light in a predetermined wavelength region.

According to the fourth aspect of the invention, there is provided a method for reading the information recorded on the medium mentioned in connection with the third aspect of the invention, wherein said medium is illuminated with relatively moving convergent light to detect light that transmits through said transmission type of diffraction grating or hologram, is reflected by said printed layer and diffracted by said transmission type of diffraction grating or hologram, thereby reading the information recorded on said printed layer.

According to the fifth aspect of the invention, there is provided a method for reading an information-recorded medium in which a diffraction grating-hologram composite member composed of a transmission type of diffraction grating or hologram that diffracts light in a predetermined wavelength region and a reflection type of hologram that reconstructs information is integrally provided on the surface side of a layer with another information recorded thereon by printing, which is composed of a portion that reflects light regularly and a portion that is capable of absorbing or diffracting light in a predetermined wavelength region, wherein said medium is irradiated with relatively moving convergent light to read the information reflected, diffracted and reconstructed by said reflection type of hologram and to detect light reflected by said printed layer, and diffracted by said transmission type of diffraction grating or hologram, thereby reading the information recorded on said printed layer.

According to the sixth aspect of the invention, there is provided another medium with information recorded thereon, which includes a layer with a hologram recorded thereon that is composed of a Lippmann type hologram, wherein the spacings between interference fringes are partly made wide or narrow so as to conform to additionally written information, thereby making a wavelength reconstructed by the resultant portion different from that of another portion.

According to the invention, information is recorded on a difficult-to-forge hologram, and a hologram is utilized for reading the information recorded on the printed layer. Thus, the card or other medium, even if forged anyway, will be immediately shown to be a forgery, and so is difficult to forge or falsify. Moreover, when information is recorded on a hologram, it is possible to record the information on both the hologram-recorded layer and the printed layer in a multiplexed manner, thereby achieving some considerable increase in the quantity of information recorded. In addition, the cards or other media according to the invention have much higher security against some improper use.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 21 is a schematic illustrating the construction and action of a further embodiment.

FIGS. 22(a)–(d) comprise a schematic illustrating the process of, and the action achieved by, making wide the spacings between interference fringes of a Lippmann hologram.

FIGS. 26(a)–(b) and (c1)–(c3) comprise a schematic illustrating the principle on the basis of which a spatial distribution is imparted to a reconstruction wavelength.

FIGS. 28(a) and (b1)–(b3) comprise a schematic illustrating the principle on the basis of which the color reconstructed is allowed to have a spatial distribution by means of dot percent.

DESCRIPTION OF THE PREFERRED EMBODIMENTS

Figure 1:
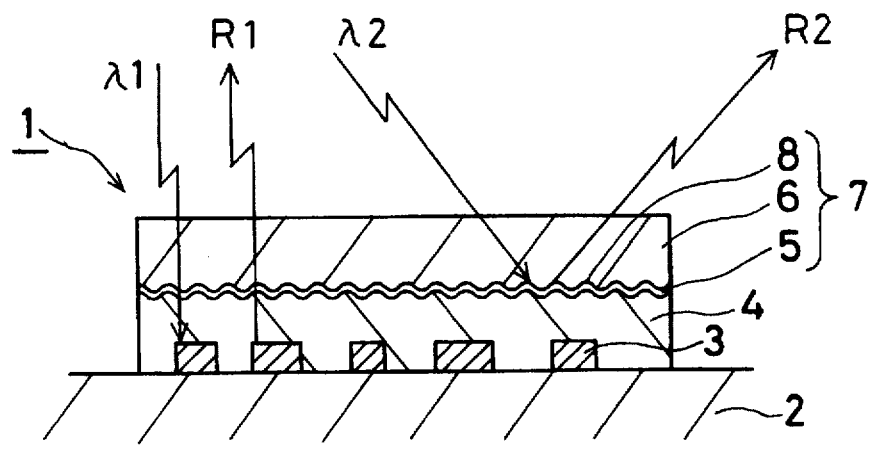
FIG. 1 is a longitudinally sectioned schematic showing the first embodiment of the information-recorded medium according to the invention.

Embodiments of the invention will now be explained at great length with reference to the accompanying drawings. FIG. 1 is a longitudinal section of the first embodiment of the multiplex information-recorded medium according to the invention. As can be seen from FIG. 1, a multiplex information-recorded medium shown generally at 1 includes a substrate 2. The substrate 2 is provided on the surface with a printed layer 3 made up of infrared light absorbing ink, and the recording layer 3 is provided thereon with a hologram-recorded layer 7 through an adhesive layer 4, which layer 7 is made up of an infrared transparent reflecting layer 5 and a relief hologram-formed layer 6 provided on the surface of the reflecting layer 5.

The hologram-recorded layer 7 may be read and reconstructed by visible light, and the printed layer 3 made up of infrared light absorbing ink cannot possibly be read by visible light; that is, it can be read only by infrared light. In the invention, it is thus essentially important that the hologram-recorded and printed layers can be read by different types of reconstruction light, i.e., that having varying wavelengths.

Thus, the multiplex information-recorded medium of the invention may be designed to be capable of being read by light having varying wavelengths. In other words, the hologram-recorded and printed layers are not limited to those formed by relief holography and infrared light absorbing ink.

In the invention, it is also essentially important that the hologram-recorded and printed layers 7 and 3 have been recorded in a superimposed manner. Which layer forms the upper layer is not critical; how these two layers are superimposed one upon another may be determined by the wavelengths of light used for reading them.

The substrate 2 may be in various forms; for instance, it may take the forms of securities, bankbooks, passports, cash cards, credit cards, prepaid cards, plastic cards, seals, etc. This substrate may also be formed of material that may be arbitrarily selected in terms of shape, thickness and quality. For instance, it may be in thin paper, plate, sheet, film, box or other forms.

For the infrared light absorbing ink used to form the printed layer 3 of the multiplex information-recorded medium 1 shown in FIG. 1, use may be made of any desired ink that shows absorption in the infrared region having a wavelength of 700 μm or higher. For instance, this ink may be prepared by dispersing anthraquinone, imminium, polymethine, dimminium and cyanine base infrared light absorbers, e.g., IR-750, 770 and 884 (Nippon Kayaku K. K.) in vehicles. These vehicles may be suitably selected from cellulose derivatives, styrene resins, (meth) acrylic resins, rosin ester resins, vinyl acetate resins, cumarone resins, vinyl chloride resins, polyester resins, polyurethane resins, butyral resins, and the like. If required, plasticizers and other additives may be used as well. The printed layer 3 may be formed by conventional printing or coating techniques such as gravure printing, offset printing, and roll coating.

The hologram-recorded layer 7 is made up of a relief hologram-formed layer 6, asperities 8 formed on the layer 6, on which holographic interference fringes are recorded, and a reflecting layer 5 that is transparent to the infrared region.

For the relief hologram-formed layer 6, use may be made of thermoplastic resins such as polyvinyl chloride resin, acrylic resin, polystyrene and polycarbonate; thermosetting resins such as unsaturated polyester resin, acrylic urethane resin, epoxy-modified acrylic resin, epoxy-modified unsaturated polyester resin, alkyd resin and phenolic resin; and ionizing radiations curable resins such as mixtures of oligomers such as epoxy acrylate, urethane acrylate and acrylic-modified polyester with suitable monomers such as neopentyl glycol acrylate and trimethylolpropane triacrylate that are added thereto for the purpose of regulating crosslinked structures and viscosities. These resins may be used alone or in combination with two or more, and may additionally contain heat or ultraviolet curing agents such as various isocyanate resins, metal soaps such as cobalt naphthenate and zinc naphthenate, peroxides such as benzoyl peroxide and methyl ethyl ketone peroxide, benzophenone, acetophenone, anthraquinone, naphthoquinone, azobisisobutyronitrile, diphenyl sulfide, etc.

Preferably, the relief hologram-formed layer 6 should have a thickness of about 0.5 μm to about 20 μm.

The asperities 8 of the hologram, although varying depending on the type of resin forming the relief hologram-formed layer, may be formed by embossing or otherwise processing the upper surface of the hologram-formed layer 6. For instance, when use is made of the ionizing radiation curing resin mentioned above, an original plate having thereon holographic asperities may be brought in close contact with a layer of the resin, while the resin layer remains uncured. In that state, the resin layer is then exposed to ionizing radiations for curing.

For the asperities 8 of the hologram, a relief hologram or diffraction grating in which the light intensity distribution of interference fringes produced by the interference of object light and reference light is recorded according to a desired asperity pattern may be recorded on the resin layer. For instance, use may be made of laser-reconstructible holograms such as Fresnel, Fraunhofer, lensless Fourier transform and image holograms, and white light-reconstructible holograms such as rainbow holograms. Use may also be made of holograms making use of the principles of these such as color holograms, computer holograms, hologram displays, multiplex holograms, holographic stereograms, or holographic diffraction gratings making use of hologram recording means. Besides, use may be made of holograms that enable diffraction gratings to be mechanically produced with the use of an electronographic device, etc., thereby obtaining any desired diffracted light by calculation, or diffraction gratings. These holograms may be recorded independently or in a multiplexed manner.

For the reflecting layer 5 transparent to the infrared region, which is formed on the holographic asperities 8, use is made of a compound that is transparent to infrared light but is so opaque to visible light that it can reflect visible light. Set out in TABLE 1 are materials that are transparent to light in the infrared or ultraviolet region together with their refractive indices, n. The reflecting layer 5 may be formed, usually with a thickness of 10 to 10,000 Å, by thin film forming techniques such as vapor deposition, sputtering, electroplating or ion plating.

TABLE 1

MATERIALS TRANSPARENT TO LIGHT IN THE INFRARED OR ULTRAVIOLET REGION

| | Refractive Indices, n |
|---|---|
| CdSe | 3.5 |
| CdTe | 2.6 |
| Ge | 4.0 to 4.4 |
| $HfO_2$ | 2.2 |
| PbTe | 5.6 |
| PbS | 3.9 to 4.3 |
| Si | 3.4 |
| Te | 4.9 |
| TlCl | 2.6 |
| ZnTe | 2.8 |
| InSb | 4.0 |
| InAs | 3.4 |

Known adhesives may be used as the adhesive resin to form the adhesive layer 4. For instance, mention is made of rubber materials such as polyisoprene rubber, polyisobutylene rubber and styrene-butadiene rubber, (meth) acrylates such as polymethyl (meth) acrylate, polyethyl (meth) acrylate, polypropyl (meth) acrylate, polybutyl (meth) acrylate, poly 2-ethylhexyl acrylate, polyvinyl ethers such as polyisobutyl ether, polyvinyl acetates such as polyvinyl acetate and vinyl chloride-vinyl acetate copolymers, polyamides such as polyacrylamide and polymethylol acrylamide, vinyl chlorides such as polyvinyl chloride, polystyrene, polyester, polyolefin chloride, polyvinyl butyral, vinyl acetate-octyl acrylate, vinyl acetate-butyl acrylte, vinylidene chloride-butyl acrylate, and so on.

Referring to the multiplex information-recorded medium 1 shown in FIG. 1, it is possible to use visible light to read the information recorded on the upper hologram-recorded layer 7 made up of a relief hologram. However, the information on the lower printed layer 3 formed by the infrared light absorbing ink cannot be read by visible light, because the visible light is reflected by the reflecting layer 5. However, infrared light passes through the reflecting layer 5 and reaches the infrared light absorbing ink layer, from which it is reflected, and the reflected light is received by a sensor for reconstructing the information on the layer 3.

When the multiplex information-recorded medium 1 is viewed from above, it is possible to see if the hologram is formed in it. However, the printed layer 3 formed of the infrared light absorbing ink by printing cannot be seen from the outside due to the presence of the reflecting layer 5 (which reflects visible light); the information can by no means be read; or that layer remains invisible to the eye.

To identify the multiplex information-recorded medium 1, infrared light is used as incident light λ1 and visible light as incident light λ2. Then, the intensities, directions and distributions of reflected light R1 from the layer 3 and diffracted light R2 from the layer 7 are detected to read the respective information visually or mechanically. Then, the recorded medium 1 itself can be identified by at least two types of information, i.e., the holographic information and the printed information. What information is recorded on the holographic and printable layers is not particularly critical. For instance, general data may be recorded on the holographic layer, while special data may be recorded on the printable layer. The cost of recording the same information on a larger number of holographic layers is low, but the cost of recording different, special data for every holographic layer is higher. It is thus preferable to record general data on the holographic layer as common information and to record special data on the printable layer—because such data can be easily printed on the printable layer as by a printer.

Figure 2:
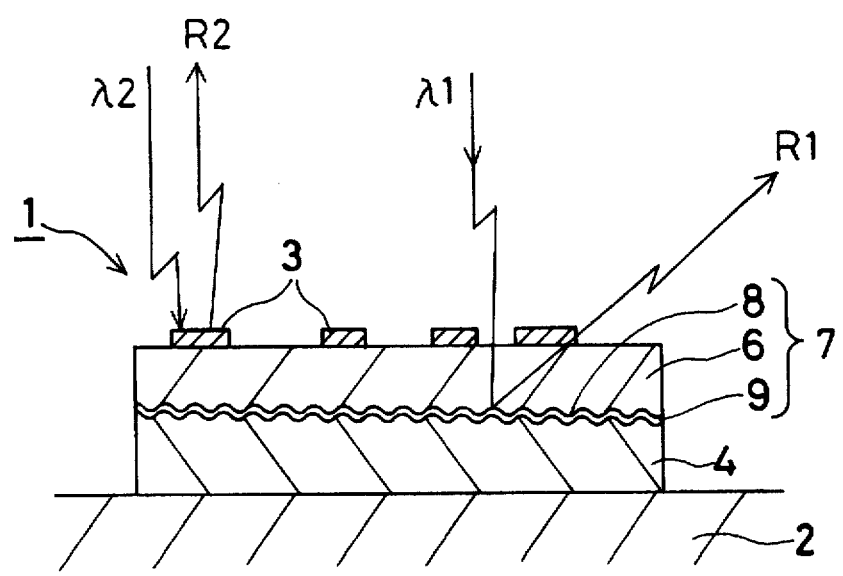
FIG. 2 is a longitudinally sectioned schematic showing the second embodiment of the information-recorded medium according to the invention.

FIG. 2 is a longitudinal section of the second embodiment of the multiplex information-recorded medium according to the invention. In the multiplex information-recorded medium 1 shown in FIG. 2, the outermost relief hologram-formed layer 6 is provided on the surface with a printed layer 3 that is made up of ink that has the property of being transparent to light in the infrared region but reflecting and absorbing light in the visible light region (e.g., ordinary printing ink), and an infrared light-reflecting layer 9 that reflects light belonging to a specific infrared region alone is formed as the reflecting layer.

The infrared light-reflecting layer 9 may be made up of any desired material that can reflect light in the infrared region. For instance, material capable of reflecting light in the full infrared region includes metals such as Ag, Al, Au, Cd, Cu, Ga, In, Mg, Pt and Zn or their oxides, nitrides, etc., which may be used alone or in combination of two or more. More preferably, the material for forming the infrared light-reflecting layer is transparent to light in the visible region. For instance, if use is made of a reflecting film 1 (Drude's mirror )that is transparent to the visible region and makes use of a cutoff due to the plasma vibration of free carriers of a semiconductor such as $In_2O_3$ (Sn) or $SnO_2$, or a reflecting film of increased transmittance in the visible region, that is formed of transparent dielectric materials between which there is interposed a thin film of a metal that has large reflectivity in the infrared region, for instance, ZnS/Ag/ZnS, $TiO_2$/Ag/$TiO_2$, SiO/Al, SiO/Ge/Al, or Cr—$Cr_2O_3$/Ni, it is then unlikely that the presence of the underlying hologram-recorded layer interferes with reading the printed information.

In the multiplex information-recorded medium 1 shown in FIG. 2, the information on the printed layer is reconstructed by visible light and the information on the hologram-recorded layer by infrared light. It is here noted that the hologram-recorded layer cannot be seen through. In the present invention, when the hologram-recorded layer is formed as a reflection type of relief hologram, the desired transparency to wavelength can be suitably selected by choosing one out of various reflecting layers.

It is understood that the identification of this multiplex information-recorded medium may be achieved by reconstructing the hologram-recorded layer by infrared light and the printed layer by visible light.

Figure 3:
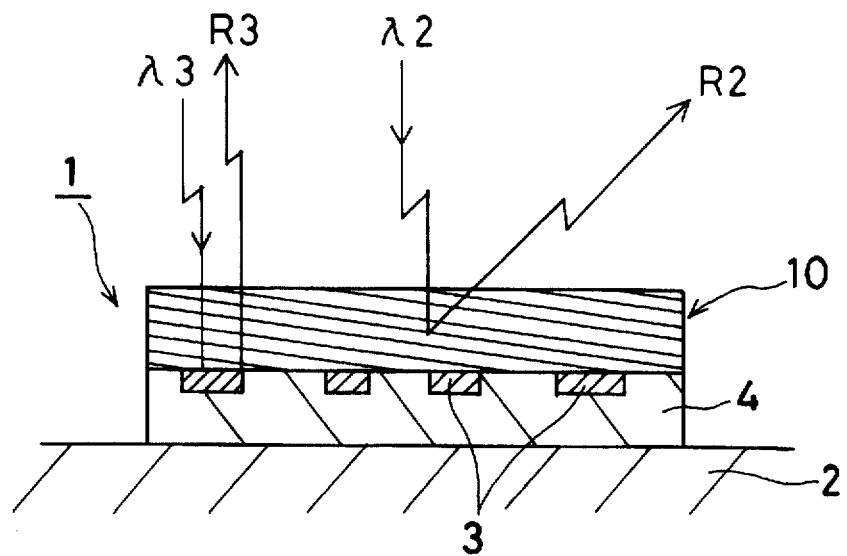
FIG. 3 is a longitudinally sectioned schematic showing the third embodiment of the information-recorded medium according to the invention.

FIG. 3 is a longitudinal section showing the third embodiment of the multiplex information-recorded medium according to the invention. In the recorded medium 1 shown in FIG. 3, a Lippmann hologram-recorded layer 10 is used in place of the relief hologram-formed layers 7 of the recorded media shown in FIGS. 1 and 2. Below the hologram-formed layer 10, there is disposed a printed layer 3 formed of infrared fluorescent ink.

The hologram-recorded layer used in the invention is not limited to a relief hologram. As in the multiplex information-recorded medium 1 shown in FIG. 3, a Lippmann type hologram may be used. Having a laminated form of interference fringes made up of holographic interference fringes produced in the depth wise direction of the hologram-formed layer, the Lippmann type hologram may be produced, using a photographic sensitive material, e.g., a photosensitive material such as a Lippmann emulsion, bichromated gelatin, or a photopolymer.

The Lippmann type hologram, when the recorded laminated form of interference fringes are illuminated with white light that is located at the position of a reference light source, strongly reflects light, with the wavelength twice as long as that of the interference fringes, due to Bragg reflection, but is transparent to light having other wavelengths. Therefore, even when white light is used as the light source, it is possible to achieve a clearly reconstructed image of the reflection type hologram, just as in the case of using a coherent light source such as a laser light source. In other words, the Lippmann type hologram itself is selectively transparent to wavelength, eliminating the need of using a reflective thin film.

The printed layer 3 of the multiplex information-recorded medium 1 shown in FIG. 3 is formed of ink that is capable of absorbing ultraviolet rays and instead emitting fluorescence. Ink used to this end is obtained by adding the following fluorescent pigments to vehicles. As the pigments, by way of example alone, mention is made of (1) an alkali halide such as NaCl or KCl, (2) an element semiconductor such as silicon, (3) a compound semiconductor such as ZnS, CdS, GaP or GaAs, (4) a metal oxide such as $Al_2O_3$ or $Y_3Al_5O_{12}$, and (5) a silicate such as $ZnSiO_4$.

The identification of the multiplex information-recorded medium 1 shown in FIG. 1 may be achieved on the basis of the information reconstructed by ultraviolet rays λ3 and visible light λ2 (that may be incandescence light by way of example).

In connection with FIG. 3, it is understood that the printed layer 3 may be formed of ink that absorbs infrared light. In this case, the identification of the multiplex information-recorded medium 1 may be achieved on the basis of the information reconstructed by infrared light λ3 and visible light λ2 (that may be incandescence light, for instance). Further, it is noted that plural items of information, not one item, may have been recorded on the Lippmann hologram-recorded layer 10 in wavelength multiplexed fashion.

Figure 4:
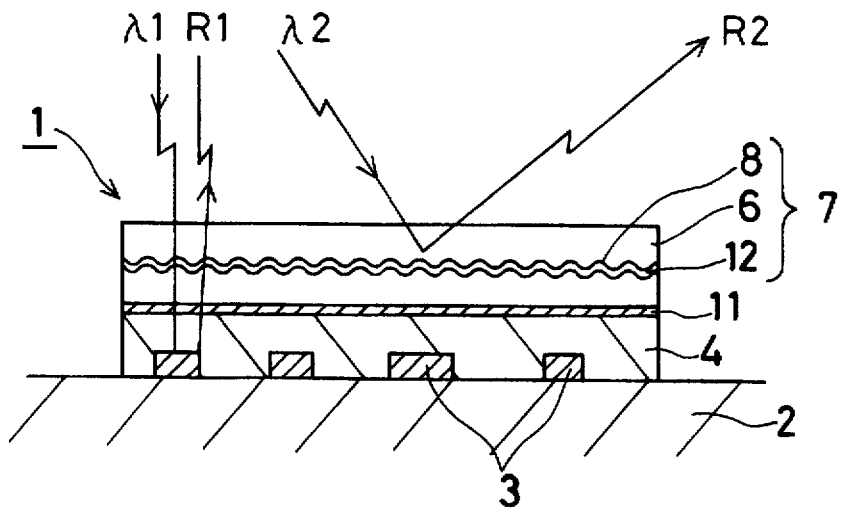
FIG. 4 is a longitudinally sectioned schematic showing the fourth embodiment of the information-recorded medium according to the invention.

FIG. 4 is a longitudinal section showing the fourth embodiment of the multiplex information-recorded medium 1 according to the invention, which is another embodiment of the medium shown in FIG. 1. In this multiplex information-recorded medium 1, a block layer 11 is interposed between a relief hologram-formed layer 6 and a printed layer 3 produced by infrared light absorbing ink. The block layer 11 is formed by the printing or coating of an ink or coating material obtained by adding to vehicles a variety of pigments or dyes that are transparent to infrared light but not to visible light. Usually, a printed layer, if formed of infrared light absorbing ink, is often formed in black, and so the pattern is seen through the hologram. To avoid this, the block layer may be formed by monochromatic (white or black) or multi-colored patterns, letters or pictures. This, too, makes it easy to discriminate the hologram from the rest of the recorded medium and keeps the recorded medium in good shape.

The reflecting layer 12 transparent to the visible region is used as the relief hologram reflecting layer in this invention. The reflecting layer 12 transparent to the visible region, is formed of a holographic effect thin film which, when used in combination with the hologram-formed layer 6, produces a hologram upon exposure to visible light, and includes no underlying layer. This thin film may be formed of any desired material, depending on for what purpose it is used. That is, the holographic effect thin film may be made up of (1) a metal thin film, (2) a transparent ferroelectric that is higher in the index of refraction than the hologram-formed layer, (3) a transparent, continuous thin film that is lower in the index of refraction than the hologram-formed layer, (4) a reflective metal film of 200 Å or less in thickness, (5) a resin that varies from the hologram-formed layer in terms of the index of refraction, and (6) a combination of (1)–(5).

(1) The metal thin film may be made up of a metal such as Cr, Ti, Fe, Co, Ni, Cu, Ag, Au, Ge, Si, Te, Al, Mg, Sb, Pb, Pd, Cd, Bi, Sn, Se, In, Ga or Rb, or its oxide, nitride, etc., which may be used alone or in combination of two or more. Enumerated in TABLE 2 are thin films transparent to the visible region with their refractive indices.

TABLE 2

THIN FILMS TRANSPARENT TO THE VISIBLE REGION

| Material | n | Material | n | Material | n |
|---|---|---|---|---|---|
| $Sb_2O_3$ | 3.0 | ZnS | 2.2 | $PbF_2$ | 1.8 |
| $Fe_2O_3$ | 2.7 | ZnO | 2.1 | $Cd_2O_3$ | 1.8 |
| PbO | 2.6 | CdO | 2.1 | MgO | 1.7 |
| ZnSe | 2.6 | $Nd_2O_3$ | 2.1 | $Al_2O_3$ | 1.6 |
| CdS | 2.6 | $Sb_2O_3$ | 2.0 | $LaF_3$ | 1.6 |
| $Bi_2O_3$ | 2.6 | SiO | 2.0 | $CeF_2$ | 1.6 |
| $TiO_2$ | 2.3 | $InO_3$ | 2.0 | $NdF_3$ | 1.6 |
| $PbCl_2$ | 2.3 | $Y_2O_3$ | 1.9 | $SiO_2$ | 1.5 |
| $Cr_2O_3$ | 2.3 | TiO | 1.9 | $SiO_3$ | 1.5 |
| $CeO_2$ | 2.2 | $ThO_2$ | 1.9 | | |
| $Ta_2O_5$ | 2.2 | $Si_2O_3$ | 1.9 | | |

(2) Enumerated in TABLE 3 are transparent ferroelectrics with the indices of refraction higher than those of the hologram-formed layer.

TABLE 3

| Material | n | Material | n |
|---|---|---|---|
| CuCl | 2.0 | $KTa_{0.65}Nb_{0.35}O_3$ | 2.3 |
| CuBr | 2.2 | $K_{0.3}Li_{0.4}NbO_3$ | 2.3 |
| GaAs | 3.3–3.6 | $KSr_2Nb_5O_{15}$ | 2.3 |
| GaP | 3.3–3.5 | $Sr_xBa_{1-x}Nb_2O_6$ | 2.3 |
| $N_4(CH_2)_6$ | 1.6 | $Ba_2NaNbO_{15}$ | 2.3 |
| $Bi_4(GeO_4)_3$ | 2.1 | $LiNbO_3$ | 2.3 |
| $KH_2PO_4$(KDP) | 1.5 | $LiTaO_3$ | 2.2 |
| $KD_2PO_4$ | 1.5 | $BaTiO_3$ | 2.4 |
| NH4H2PO4 | 1.5 | $SrTiO_3$ | 2.4 |
| $KH_2AsO_4$ | 1.6 | $KTaO_3$ | 2.4 |
| $RbH_2AsO_4$ | 1.6 | | |

(4) Enumerated in TABLE 4 are transparent, continuous thin films with the indices of refraction lower than that of the hologram-recorded layer.

TABLE 4

| Material | n | Material | n |
|---|---|---|---|
| LiF | 1.4 | $AlF_3$ | 1.4 |
| MgF2 | 1.4 | NaF | 1.3 |
| $3NaF.AlF_3$ | 1.4 | $CaF_2$ | 1.3 |
| KBr | 1.4 | | |

(4) Reflective metal thin films of 200 Å or less in thickness

A reflective metal thin film has a complex index of refraction represented by $$n=n-iK$$

where n is the index of refraction and K is the coefficient of absorption. Set out in TABLE 5 are examples of the material of the reflective metal thin film used in the invention with values of n and K.

TABLE 5

| Material | n | K | Material | n | K |
|---|---|---|---|---|---|
| Be | 2.7 | 0.9 | Sb | 3.0 | 1.6 |
| Mg | 0.6 | 6.1 | Pb | 1.9 | 1.3 |
| Ca | 0.3 | 8.1 | Ni | 1.8 | 1.8 |
| Cr | 3.3 | 1.3 | Sr | 0.6 | 3.2 |
| Mn | 2.5 | 1.3 | Ba | 0.9 | 1.7 |
| Cu | 0.7 | 2.4 | La | 1.8 | 1.9 |
| Ag | 0.1 | 3.3 | Ce | 1.7 | 1.4 |
| Al | 0.9 | 5.3 | Au | 0.3 | 2.4 |

Use may also be made of other materials such as Sn, In, Te, Fe, Co, Zn, Ge, Pb, Cd, Bi, Se, Ca, Rb, etc. Oxides, nitrides, etc. of the above-mentioned metals may be used alone or in combination of two or more.

(5) Resin that varies from the hologram-formed layer in terms of the index of refraction Use may be made of resin that is higher or lower than the hologram-formed layer in terms of the index of refraction, as typically set out in TABLE 6.

TABLE 6

| | |
|---|---|
| Polytetrafluoroethylene | 1.35 |
| Polychlorotrifluoroethylene | 1.43 |
| Vinyl acetate resin | 1.46 |
| Polyethylene | 1.49 |
| Polypropylene | 1.52 |
| Polystyrene | 1.60 |
| Polyvinylidene chloride | 1.62 |
| Vinyl butyral | 1.62 |
| Vinyl formal | 1.50 |
| Polyvinyl chloride | 1.53 |
| Methyl methacrylate | 1.49 |
| Nylon | 1.53 |
| Polyester | 1.55 |
| Carbolic acid formalin | 1.60 |

Besides, generally available synthetic resins may be used, but particular preference is given to using a resin with the index of refraction making a large difference with that of the hologram-formed layer 6.

(6) In addition, laminates comprising some suitable combinations of the above-mentioned materials (1) to (5) may be used.

Of the above-mentioned materials (1) to (5), a multi-layered interference filter comprising laminates, each consisting of a quarter-wave film of a substance having a high refractive index and a quarter-wave film of a substance having a low refractive index. This filter can reflect light in a specific wavelength region or transmit and absorb that light by suitable selection of material and thickness, and so can be used as the reflecting film in each example.

Of the above-mentioned thin film layers (1) to (6), the thin film layer (4) has preferably a thickness of 200 Å or less, as already noted. However, the thin film layers (1), (2), (3), (5) and (6) may have a thickness to such an extent that they are transparent, and may generally have a thickness of preferably 10 to 10,000 Å, more preferably 100 to 5,000 Å. The provision of the transparent reflecting layer 12 on the hologram-formed layer 6 may be achieved by general techniques such as vacuum deposition, sputtering, reactive sputtering, ion plating and electroplating. It is noted, however, that this holds when the reflecting layer 12 is made up of any one of the above-mentioned materials (1) to (4). When the thin film is made up of the above-mentioned material (5), it is preferable to use generally available coating techniques.

In order to reconstruct the multiplex information-recorded medium 1 of the invention shown in FIG. 4, the information on the printed layer 3 may be reconstructed by infrared light λ1, while the information on the hologram-recorded layer 7 may be reconstructed by infrared light λ2. In this connection, it is understood that the information on the hologram-recorded layer shows directionality with respect to a light source, because it is only when it is irradiated from the direction of specific reconstruction light that diffracted light is generated.

Figure 5:
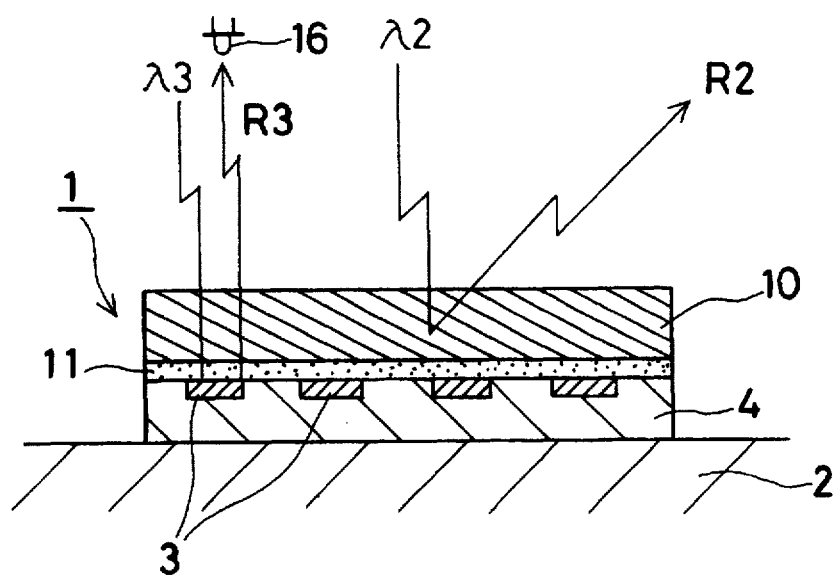
FIG. 5 is a longitudinally sectioned schematic showing the fifth embodiment of the information-recorded medium according to the invention.

FIG. 5 is a sectional schematic showing the fifth embodiment of the multiplex information-recorded medium 1 according to the invention.

This multiplex information-recorded medium 1 makes use of the Lippmann type hologram illustrated in FIG. 3, and includes a block layer 11 between a Lippmann hologram-formed layer 10 and a printed layer 3, as in the case of FIG. 4. In this embodiment, the block layer 11 is made up of a material that transmits ultraviolet rays but does not transmit visible light, when ultraviolet fluorescent ink is used for the printed layer 3. When infrared light absorbing ink is used for the printed layer 3, on the other hand, it is made up of a material that transmits infrared light but does not transmit visible light.

As is the case with the foregoing, only the information reconstructed on the Lippmann hologram-formed layer 10 is reproduced by visible light λ2 and so can be visually observed, but the information on the printed layer 3 below the block layer 11 cannot. Therefore, each information can be visually or mechanically read by detecting the intensity and distribution of the reflected light R3 from the printed layer 3 and the diffracted light R2 from the Lippmann hologram-formed layer 10; in other words, the recorded medium itself can be identified by these two types of information. If an optical sensor 16 for sensing only the light component having wavelength λ3 of the reflected light R3 is located, as illustrated, and variable information such as mechanically readable bar codes, symbols or letters are used as the information to be printed on the layer 3, it is then possible to read the printed information with unattended card processing equipment for card identification.

When infrared light ink absorbing ink is used for the printed layer 3 of the medium shown in FIG. 5, the substrate 2 must have the property of reflecting infrared light. When the substrate 2 has the property of absorbing infrared light, however, infrared light reflecting ink may be used for the printed layer 3. Alternatively, an infrared reflecting layer may be interposed between the block layer 11 and the substrate 2. In this connection, it is noted that the adhesive layer 4 may be underlaid with the printed layer 3. It is also understood that the block layer 11 is not necessarily of a black color, and may be of other colors including white. However, visible wavelength λ2 diffracted by the hologram-formed layer 10, when it has high reflectivity, is not preferable, because the information reconstructed from the hologram-formed layer 10 is difficult to see. Also, that information, when used as identification information, becomes difficult to read. Plural items of information, not one item, may be recorded on the Lippmann hologram-formed layer 10 in wavelength multiplexed fashion.

Figure 6:
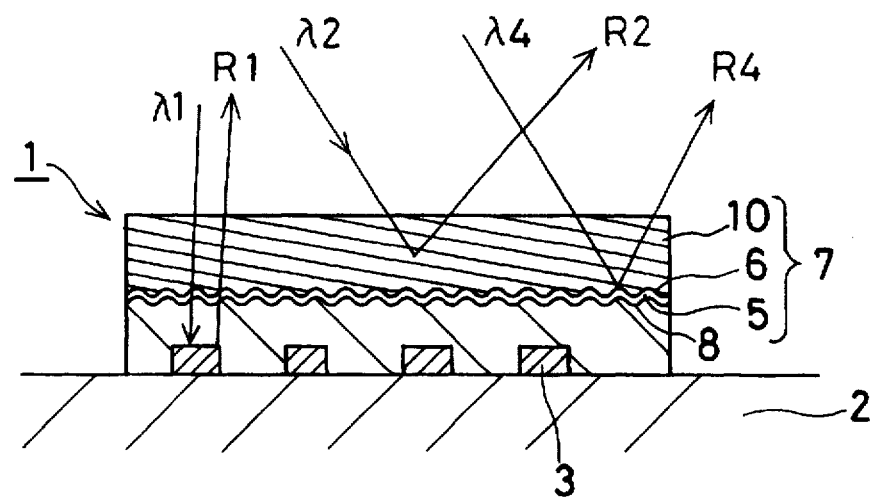
FIG. 6 is a longitudinally sectioned schematic showing the sixth embodiment of the information-recorded medium according to the invention.

FIG. 6 is a longitudinal section showing the sixth embodiment of the multiplex information-recorded medium 1 according to the invention.

This multiplex information-recorded medium 1 includes a hologram-recorded layer 7 built up of a Lippmann hologram-formed layer 10, a relief hologram-formed layer 6 laminated thereon, and a reflecting layer 5 that is transparent to the infrared region. As illustrated, the hologram-recorded layer 7 overlies a printed layer 3 formed of infrared light absorbing ink. According to the invention, it is thus possible to use the Lippmann type hologram in combination with a reflection type of relief hologram.

Figure 7A:
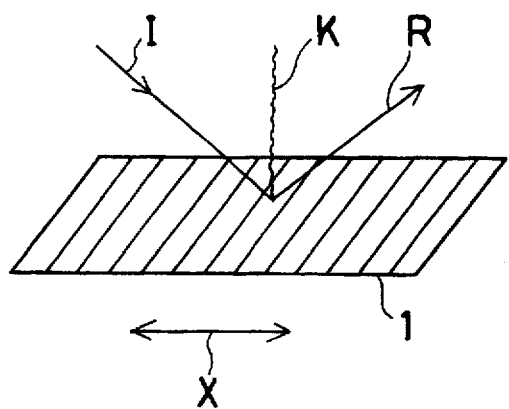
FIGS. 7(a)–(b) comprise a schematic illustrating how to achieve selective identification due to a difference in the direction of light.
Figure 7B:
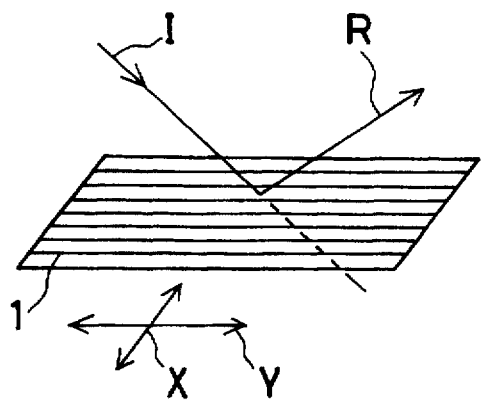

The identification of the recorded medium according to this embodiment may be achieved by selectively and individually reconstructing the information on the hologram-recorded layer and printed layer with the use of light having different wavelength regions. However, it is also possible to achieve selective reconstruction of each information by the illumination direction of light. This is because, when the hologram-recorded layer 7 of the multiplex information-recorded medium 1 is illuminated with incident light I in the direction X along which the interference fringes are arranged, as shown in FIG. 7, diffracted light K and regularly reflected light R are obtained (see FIG. 7(a)). However, when the hologram-recorded layer 7 is illuminated with incident light I in the direction Y normal to the direction X along which the interference fringes are arranged, it is only reflected light R, not diffracted light, which is obtained, and this renders it possible to reconstruct the holographic information. By making use of this phenomenon, it is possible to selectively recognize the hologram-recorded layer alone, depending on the direction of light that illuminates the multiplex information-recorded medium.

Figure 8A:
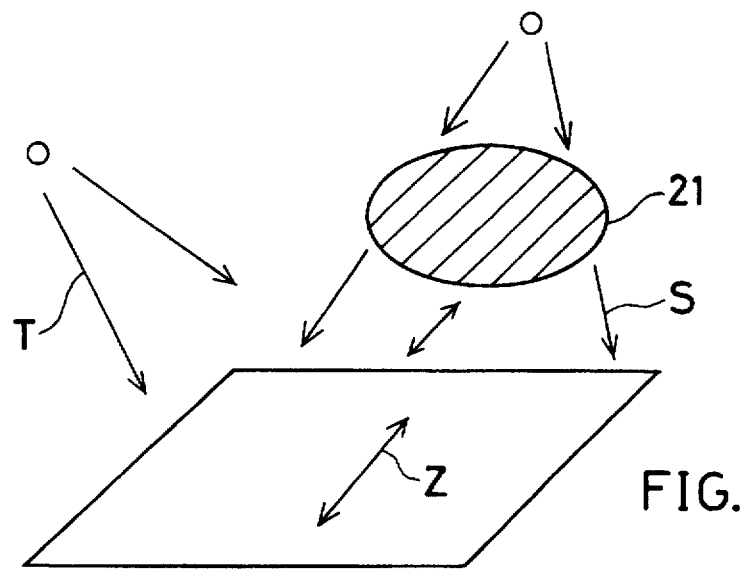
FIGS. 8(a)–(b) comprise a schematic illustrating how to achieve selective identification due to a difference in the polarizing plane of light.
Figure 8B:
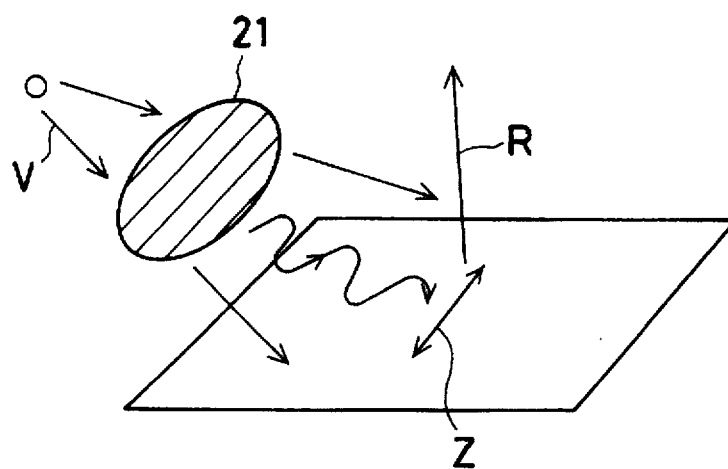
Figure 8C:
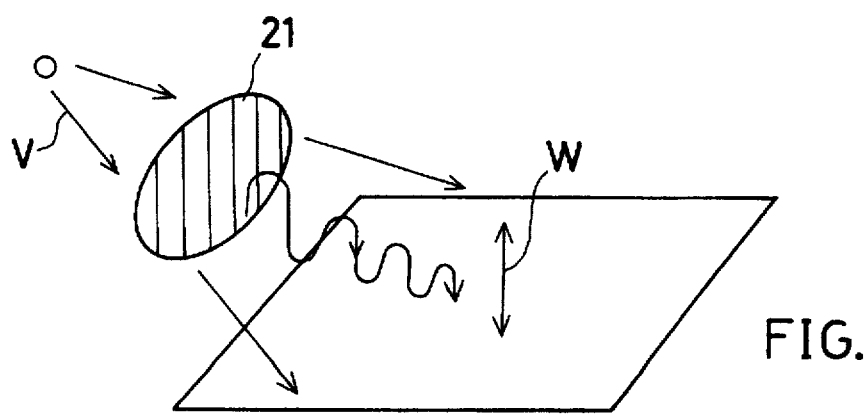

FIGS. 8(a)–(c) comprise a schematic illustrating how to selectively identify a multiplex information-recorded medium by the plane of polarization of light.

With the method of selectively identifying the medium according to the invention, it is possible to selectively reconstruct the hologram by varying the plane of polarization of illumination light. As illustrated in FIG. 8(a), a photograph is first taken of a hologram. In this case, however, object light S (or alternatively reference light T) is polarized through a polarizing filter 21 or other means to the proper direction, thereby recording the hologram. Then, as shown in FIG. 8(b), the hologram is illuminated with reconstruction light V through the polarizing filter 21 in such a way that light equivalent to the plane of polarization is obtained, whereby diffracted light R is obtained. However, when reconstruction light R is polarized in a direction w that is not equivalent to the plane of polarization by changing the direction of the polarizing filter 21, it is impossible to obtain any light diffracted by the hologram; it is impossible to reconstruct the hologram. Thus, only when illumination light including polarized light equivalent to the plane of polarization during recording is used for hologram reconstruction, the reconstructed image is so obtained that the information on the hologram-recorded layer can be selectively reconstructed.

The multiplex information-recorded media of the invention are best suited for use on banking cards such as bank cards, prepaid cards such as telephone cards, traffic cards such as passenger and commuter tickets, identification cards such as passports, ID cards such as medical cards, notes such as securities, etc.

More illustrative examples of cards, transfer foils, seals and the like obtained by using such multiplex information-recorded media as mentioned above will now be explained. It is noted that in the ensuing description, some terms used hereinafter are slightly different from those used hereinbefore, but they are substantially tantamount to each other in terms of connotation.

Figure 9:
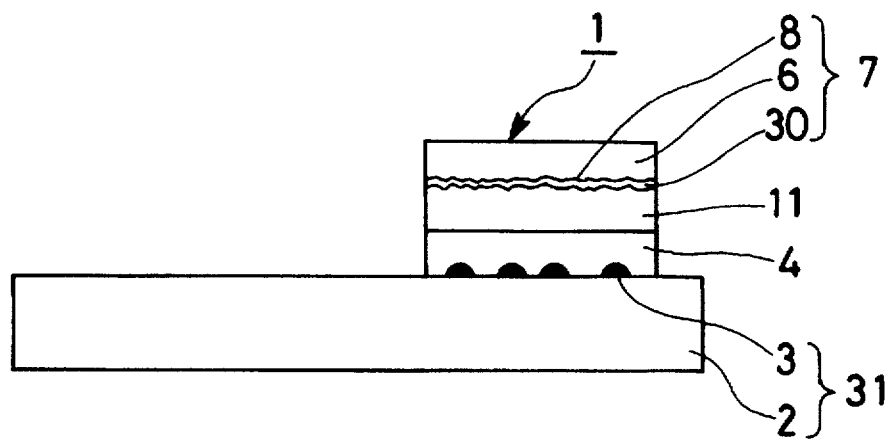
FIG. 9 is a sectional view of an embodiment of the card form of information-recorded medium according to the invention.

FIG. 9 is a sectional schematic of one example of a card form of multiplex information-recorded medium 1 according to the invention. This card is built up of a hologram-recorded layer 7 including a transparent relief hologram-recorded layer 6 on which a light diffraction pattern is recorded as a pattern 8 with asperities and a reflecting layer 30 that is formed on the surface of the layer 6 on which the pattern 8 is formed, a block layer 11 that substantially transmits infrared light but does not visible light, an adhesive layer 4, and a printed portion 31 in which variable information is recorded on a substrate that reflects infrared light in the form of a printed layer 3 that absorbs infrared light. These parts are successively laminated or otherwise stacked one upon another.

For the asperities 8 of the hologram, a relief hologram or diffraction grating in which the light intensity distribution of inteference fringes produced by the interference of object light and reference light is recorded according to asperity pattern may be recorded on the resin layer. For instance, use may be made of laser-reconstructible holograms such as Fresnel, Fraunhofer, lensless Fourier transform and image holograms, and white light-reconstructible holograms such as rainbow holograms. Use may also be made of holograms making use of the principles of these such as color holograms, computer holograms, hologram displays, multiplex holograms, holographic stereograms, or holographic diffraction gratings making use of hologram recording means. Besides, use may be made of holograms that enable diffraction gratings to be mechancially produced with the use of an electronographic device, etc., thereby any desired diffracted light by calculation, or diffraction gratings. These holograms may be recorded independently or in a multiplexed manner.

These holograms or diffraction gratings are generally of a transmission type (wherein the incident side of illumination light is located opposite to the observation side of an observer with a hologram or diffraction grating between them), and the transmission type is converted to a reflection type (wherein the incident side of illumination light and the observation side of an observer are located on the same side of a hologram or diffraction grating) by providing a thin film layer on the surface thereof on which asperities are formed.

A light diffraction pattern may be produced by making use of photosensitive resin, thermoplastics, etc. The hologram or diffraction grating is first expressed in the form of asperities to make a relief hologram or relief diffraction grating. Then, the obtained relief hologram or relief diffraction grating is plated or otherwise formed to make a metallic or resinous mould. With this mould, some techniques for shaping synthetic resin are used to duplicate the relief hologram or relief diffraction grating in large quantities. The resin layer 1 is formed of a resin material capable of being shaped, and has a thickness of about 0.4 to 4 µm, preferably 1 to 2 µm.

By way of example alone, the synthetic resin materials capable of being shaped include thermoplastics such as polyvinyl chloride, acrylic resins (e.g., MMA), polystyrene and polycarbonate, resins obtained by setting thermosetting resins such as unsaturated polyester, melamine, epoxy, polyester (meth) acrylate, urethane (meth) acrylate, epoxy (meth) acrylate, polyether (meth) acrylate, polyol (meth) acrylate, melamine (meth) acrylate and triazine acrylate. In some cases, mixtures of these thermoplastics and thermosetting resins may be used.

For such synthetic resins capable of being shaped, thermoforming materials having a radical polymerizable unsaturated group may be used, and are broken down into the following two types:

1. Polymers having a radical polymerizable unsaturated group, with the glass transition points of 0° C. to 250° C. More illustratively, these polymers are obtained by introducing radical polymerizable unsaturated groups in polymers or copolymers of the following compounds (1) to (8) by the techniques (i) to (iv) to be described later.

(1) Monomers having hydroxyl groups, for instance, N-methylolacrylamide, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxy-3-phenoxypropyl acrylate, and 2-hydroxy-3-phenoxypropyl methacrylate.

(2) Monomers having carboxyl groups, for instance, acrylic acid, methacrylic acid, and acryloyloxyethyl monosuccinate.

(3) Monomers having epoxy groups, for instance, glycidyl methacrylate.

(4) Monomers having aziridinyl groups, for instance, 2-aziridinylenyl methacrylate, and allyl 2-aziridinyl propionate.

(5) Monomers having amino groups, for instance, acrylamide, methacrylamide, diacetone acrylamide, dimethylaminoethyl methacrylate, and diethylaminoethyl methacrylate.

(6) Monomers having sulfone groups, for instance, 2-acrylamide-2-methylpropane sulfonate.

(7) Monomers having isocyanate groups, for instance, radical polymerizable adducts of diisocynates and active hydrogen such as 2,4-toluene diisocyanate and 2-hydroxyethyl acrylate at a 1 to 1 molar ratio.

(8) In order to regulate the glass transition points of the copolymers mentioned above and control the physical properties of the cured films, the compounds mentioned above may be copolymerized with monomers copolymerizable therewith, such as those mentioned below. These copolymerizable monomers, for instance, include methyl acrylate, methyl methacrylate, ethyl acrylate, ethyl methacrylate, propyl acrylate, propyl methacrylate, butyl acrylate, butyl methacrylate, isobutyl acrylate, isobutyl methacrylate, t-butyl acrylate, t-butyl methacrylate, isoamyl acrylate, isoamyl methacrylate, cyclohexyl acrylate, cyclohexyl methacrylate, 2-ethylhexyl acrylate, and 2-ethylhexyl methacrylate.

The material according to the invention may be obtained by introducing radical polyermizable unsaturated groups in the polymers obtained in the manner mentioned above by the following reaction procedures.

(i) When the polymer or copolymer is composed of the monomer having a hydroxyl group, it may be condensed with a monomer having a carboxyl group such as an acrylic or methacrylic acid.

(ii) When the polymer or copolymer is composed of the monomer having a carboxyl or sulfone group, it may be condensed with the monomer having a hydroxyl group.

(iii) When the polymer or copolymer is composed of the monomer having an epoxy, isocyanate or aziridinyl group, the monomer having a hydroxyl group or a monomer having a carboxyl group may be added thereto.

(iv) When the polymer or copolymer is composed of the monomer having a hydroxyl or carboxyl group, a monomer having an epoxy or aziridinyl group, or a monomer having a 1 to 1 mole adduct of a diisocyanate compound and a hydroxyl group-containing acrylic ester monomer may be added thereto.

Preferably, the reactions mentioned above should all be carried out in the presence of a slight amount of a polymerization inhibitor such as hydroquinone, while dry air is supplied to the reaction systems.

2. Compounds having radical polymerizable unsaturated groups, with the melting points of 0° C. to 250° C. By way of example alone, mention is made of stearyl acrylate, stearyl methacrylate, triacryl isocyanurate, cyclohexanediol diacrylate, cyclohexanediol dimethacrylate, spiroglycol, diacrylate, and sprioglycol dimethacrylate.

For the synthetic resins capable of being shaped, the above-mentioned compounds 1 and 2 may be used in admixture. Alternatively, the mixtures may additionally contain radical polymerizable unsaturated monomers. These radical polymerizable unsaturated monomers are used for the purpose of improving crosslink density during irradiation with ionizing radiations, and for these use may be made of, in addition to the aforesaid monomers, ethylene glycol diacrylate, ethylene glycol dimethacrylate, polyethylene glycol diacrylate, polyethylene glycol dimethacrylate, hexanediol diacrylate, hexanediol dimethacrylate, trimethylolpropane triacrylate, trimethylolpropane diacrylate, trimethylolpropane dimethacrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, ethylene glycol diglycidyl ether diacrylate, ethylene glycol diglycidyl ether dimethacrylate, polyethylene glycol diglycidyl ether diacrylate, polyethylene glycol diglycidyl ether dimethacrylate, propylene glycol diglycidyl ether diacrylate, propylene glycol diglycidyl ether dimethacrylate, polypropylene glycol diglycidyl ether diacrylate, polypropylene glycol diglycidyl ether dimethacrylate, sorbitol tetraglycidyl ether tetraacrylate, and sorbitol tetraglycidyl ether tetramethacrylate. Preferably, these monomers may be used in an amount of 0.1 to 100 parts by weight per 100 parts by weight of the aforesaid copolymer mixture, calculated as solid. They may be well cured by electron radiations. However, when they are cured by irradiation with ultraviolet rays, it is possible to use sensitizers that give out radicals by irradiation with ultraviolet rays, for example, benzoin ethers such as benzoquinone, benzoin, and benzoin methyl ether, halogenated acetophenones, and biacetyls.

Known conventional procedures may be used to provide the asperities 8 of the relief hologram or relief diffraction grating on the relief hologram-formed layer 6, using synthetic resin capable of being shaped such as those mentioned above. All available molds for forming relief holograms or relief diffraction gratings are used. By way of example alone, (1) a photoresist mold in which the interference fringes of object light and reference light are formed on the photoresist in the form of asperities by exposure and development, (2) a metallic mold in which the asperities mentioned above are duplicated on the side (mold surface) thereof by means of silver or nickel plating, and (3) a resinous mold in which the asperities of the mold (1) or (2) is duplicated by use of synthetic resin, can be used. Preferably, these molds, when used, are duplicated in a large number, and then suitably arranged by suitable means to make a composite mold arrangement, with which many relief holograms or relief diffraction gratings can be duplicated in a single shaping process. It is noted that when the mold is made up of synthetic resin, it is preferable to use thermosetting or ionizing radiation curing synthetic resin as the material in view of improving the wear resistance of the mold or, the heat resistance of the mold—this holds for when hot pressing is done.

The reflecting layer 30 is provided to impart reflectivity to the asperities 8 of the hologram or diffraction grating of the relief hologram-formed layer 6, and is formed of a metal such as Cr, Ti, Fe, Co, Ni, Cu, Ag, Au, Ge, Al, Mg, Sb, Pb, Pd, Cd, Bi, Se, Sn, In, Ga or Rb, or its oxide, nitride, etc., which may be used alone or in combination of two or more. Among these, particular preference is given to Al, Cr, Ni, Ag and Au.

The reflecting layer 30 may be formed by sputtering, ion plating, CVD or plating, and has preferably a thickness of 200 to 1,000 Å.

In place of thin films formed of the aforesaid metals and/or metal oxides and/or metal nitrides, a continuous thin film of a material that varies from the relief hologram-formed layer 6 in terms of the index of refraction may be used as well, albeit being transparent as such.

Enumerated below are materials larger than the transparent layer in terms of the index of refraction with the bracketed numerals of n indicating the refractive indices. $Sb_2S_3$ (n=3.0), $Fe_2O_3$ (n=2.7), $TiO_2$ (n=2.6), CdS (n=2.6), $CeO_2$ (n=2.3), ZnS (n=2.3), $PbCl_2$ (n=2.3), $Sb_2O_3$ (n=2.0), $WO_3$ (n=2.0), SiO (n=2.0), $In_2O_3$ (n=2.0), PbO (n=2.6), $Ta_2O_5$ (n=2.4), ZnO (n=2.1), $ZrO_2$ (n=2.0), $Cd_2O_3$ (n=1.8), $Al_2O_3$ (n=1.6), $CaO.SiO_2$ (n=1.8), etc.

Preferably, the continuous thin film is larger in terms of the index of refraction than the relief hologram-formed layer 6 by 0.3 or more, more particularly 0.5 or more. As a result of the present inventors' experiments, it has been found that a refractive index difference of 1.0 or more is best.

Usually, it is preferable that the thin film has a thickness of 10 to 1,000 Å on condition that it lies in the transparent region of the material forming the reflecting layer 30. The formation of the reflecting layer 30 on the relief-formed surface of the relief hologram-formed layer 6 may be achieved by generally available thin-film forming techniques such as vacuum deposition, sputtering, reactive sputtering or ion plating.

This continuous thin film having a large refractive index behaves as a simple transparent body outside an angular range in which a hologram or diffraction grating can be reconstructed, because of the dependency of reconstruction on angle that is the characteristic feature of a hologram or diffraction grating. Within the angular range in which a hologram or diffraction grating can be reconstructed, in contrast, its reflectivity with respect to light is so maximized that it has the reflective hologram or diffraction grating effect.

The aforesaid continuous thin film may have a refractive index smaller than that of the relief hologram-formed layer 6, and so may be formed of, for instance, LiF (n=1.4), $MgF_2$ (n=1.4), $3NaF.AlF_3$ (n=1.4 or 1.2), $AlF_3$ (n=1.4), $CaF_2$ (n=1.3 or 1.4), and NaF (n=1.3).

Likewise, a ferroelectric material having a refractive index larger than that of the relief hologram-formed layer 6 may be used as well. By way of example alone, mention is made of CuCl (n=2.0), CuBr (n=2.2), GaAs (n=3.3 to 3.6), GaP (n=3.3 to 3.5), $N_4(CH_2)_6$ (n=1.6), $Bi_4(GeO_4)$ (n=2.1), $KH_2PO_4$(KDP) (n=1.5), $KD_2PO_4$ (n=1.5), $NH_4H_2PO_4$ (n=1.5), $KH_2AsO_4$ (n=1.6), $RbH_2AsO_4$ (n=1.6), $BaTiO_3$ (n=2.4), $KTa_{0.65}Nb_{0.35}O_3$ (n=2.3), $K_{0.6}Li_{0.4}NbO_3$ (n=2.3), $KSr_2Nb_5O_{15}$ (n=2.3), $Sr_xBa_{1-x}Nb_2O_6$ (n=2.3), $Ba_2NaNbO_{15}$ (n=2.3), $LiNbO_3$ (n=2.3), $LiTaO_3$ (n=2.4), $SrTiO_3$ (n=2.4), and $KTaO_3$ (n=2.2).

Moreover, the reflecting layer 30 may be formed of a layer of transparent synthetic resin that is different from the relief hologram-formed layer 6 in terms of the index of refraction. By way of example alone, the following synthetic resins may be used: polytetrafluoroethylene (n=1.35), polychlorotrifluoroethylene (n=1.43), polyvinyl acetate (n=1.45 to 1.47), polyethylene (n=1.50 to 1.54), polypropylene (n=1.49), polymethyl methacrylate (n=1.45), polystyrene (n=1.60), polyvinylidene chloride (n=1.60 to 1.63), polyvinyl butyral (n=1.48), polyvinyl formal (n=1.50), polyvinyl chloride (n=1.52 to 1.55), and polyester (n=1.52 to 1.57).

In principle, the hologram or diffraction grating referred to in this example includes the relief hologram-formed layer 6 having the asperities 8 of the hologram or diffraction grating on its lower side, and the reflecting layer 30 located below the layer 6, as already mentioned. It is noted, however, that the relief hologram-formed layer 6 may have the asperities 8 of the hologram or diffraction grating on its upper surface, while the reflecting layer 30 may be formed on, and contiguous to, the asperities 8 of the hologram or diffraction grating.

The block layer 11 may be formed on a desired portion by means of ordinary coating or printing techniques such as gravure, roll, knife edge and offset techniques, using coating or ink material that is prepared by incorporating various pigments or dyes that transmit infrared light but do not transmit visible light, for instance, red dyes such as MS Red GP, Macrolex Red Violet R, Ceres Red 7B, Samaron Red HBSL, and Resolin Red F3BS, yellow dyes such as Phorone Brilliant Yellow 6GL, PTY-52, and Macrolex Yellow 6G, and blue dyes such as Kayaset Blue 714, Vacsoline Blue AP-FW, Phorone Brilliant Blue S-R, and MS Blue 100 in a binder such as a cellulose derivative such as ethyl cellulose, ethylhydroxyethyl cellulose, cellulose acetate propionate, and cellulose acetate, a styrene resin or copolymer resin such as polystyrene, and poly-α-methylstyrene, acrylic resin or its homopolymer or copolymer such as polymethyl methacrylate, polyethyl methacrylate, polyethyl acrylate, and polybutyl acrylate, rosin ester resin such as rosin, rosin-modified maleic acid resin, rosin-modified phenolic resin, and polymerized rosin, polyvinyl acetate resin, cumarone resin, vinyl toluene resin, vinyl chloride resin, polyester resin, polyurethane resin, and butyral resin, optionally together with plasticizers, stabilizers, wax, grease, desiccants, drying aids, curing agents, thickeners, and dispersants, followed by well kneading with solvents or diluents.

It is noted that the block layer 11 may be formed monochromatically or with desired patterns, letters, pictures, etc., using dyes or pigments of varying colors.

For the adhesive layer 4, various types of adhesives may be used. By way of example alone, examples of the adhesives are mentioned below.

Phenolic resin, furan resin, urea resin, melamine resin, polyester resin, polyurethane resin, epoxy resin or other thermosetting resins; polyvinyl acetate resin, polyvinyl alcohol resin, polyvinyl chloride resin, polyvinyl butyral resin, poly (meth) acrylic resin, nitrocellulose, polyamide or other thermoplastic resins; butadiene-acrylonitrile rubber, neoprene rubber or other rubber; glue; natural resins; casein; sodium silicate; dextrin; starch; and gum arabic may be used alone or in combination of two or more to prepare suitable adhesives. These adhesives are not critical in terms of type, and so all available types inclusive of solution, emulsion, powder and film types may be used. They may also be of cold-setting, solvent sensitive, melting-setting and other types.

Moreover, what is called pressure-sensitive adhesives (or self-adhesives), for instance, acrylic or acrylic ester resin or their copolymer, styrene-butadiene copolymer, natural rubber, casein, gelatin, rosin ester, terpene resin, phenolic resin, styrene resin, cumarone-indene resin, xylene, aliphatic hydrocarbons, polyvinyl alcohol, polyethylene oxide, polymethylene oxide, and polyethylene sulfonate may be used as the adhesives in this example. It is also possible to make use of heat-sensitive adhesives that produce adhesion by heating (or, in another parlance, heat-sealers).

For the materials forming the heat-sensitive adhesives, mention is made of thermoplastic resins such as polyethylene and polyvinyl acetate or their copolymers, acrylic resin or an ethylene-acrylic acid copolymer, polyvinyl butyral, polyamide, polyester, plasticized chloroprene, polypropylene, polyvinyl ether, polyurethane, cellulosic resin, waxes, paraffins, rosins, and asphalts, and uncured thermosetting resins such as epoxy resin, and phenolic resin. Preferably, the adhesive layer 5 has a thickness of about 4 μm to 20 μm.

The printed layer 3 that absorbs infrared light may be formed on a desired portion by means of conventional printing techniques such as gravure, offset, silk screening, thermal transfer using a thermal head, etc., sublimation transfer, ink jet, and electrostatic adsorption processes. In this case, coating or ink material may be used, which is obtained by adding various pigments and dyes that absorb infrared light, for instance, carbon black, blackened silver, cyanine dye, phthalocyanine dye, naphthoquinone dye, anthraquinone dye, and triphenylmethane dye to a binder usable for the block layer 11, optionally together with plasticizers, stabilizers, waxes, grease, desiccants, drying aids, curing agents, thickeners, and dispersants, followed by well kneading with solvents or diluents.

The substrate 2 may be constructed from a member selected from materials such as resins, for instance, nylon, cellulose diacetate, cellulose triacetate, polyvinyl chloride, polystyrene, polyethylene, polypropylene, polyester and polyimide, and polycarbonate; metals, for instance, copper and aluminum; paper; and impregnated paper; or a composite member formed of two or more such materials, and in making the substrate 2 care should be taken of the heat resistance, strength, rigidity, shielding ability and opaqueness needed to the end. The substrate 2 may have a thickness of about 0.005 mm to about 5 mm.

The substrate 2 that reflects infrared light may be built up of white or light-colored paper such as wood free paper; white or light-colored synthetic resin such as polypropylene, polystyrene, polyvinyl chloride and polyethylene terephthalate; and synthetic paper such as carton and coat paper which is a composite material made by laminating or coating the aforesaid synthetic resins on paper. Alternatively, the substrate 2 that reflects infrared light may be constructed by coating or printing on the surface of a general substrate material coating or ink material containing members that reflect infrared light, for instance, an yellow pigment such as Yellow-1 (Hansa Yellow G), Yellow-3 (Hansa Yellow 10G), Yellow-12 (Benzidine Yellow G), Yellow-13 (Benzidine Yellow GR) or Yellow-14 (Valcan Fast Yellow G), a red pigment such as Red-3 (Lake Red 4R or Toluidine Red), Red-5 (Parmanent Carmine FB), Red-17 or Red-38 (Pyrazolone Red B), a blue pigment such as Blue-1 (Victria Pure Blue Lake), Blue-3, Blue-17:1 (Fast Sky Blue), Blue-18 (Alkali Blue), Blue-56 or 61, a black pigment such as Aniline Black, black oxide of iron or (magenta+cyan) mixtures, and a white pigment such as zinc white, titanium white, calcium carbonate, barium sulfate or alumina white. This substrate 2 may be formed by kneading such members with synthetic resin as well.

In the case of the multiplex information-recorded medium having such construction, only the light diffraction pattern information recorded on the relief layer can be visually observed at a given angle of observation, while the information recorded below the block layer 11 cannot be seen.

Figure 10:
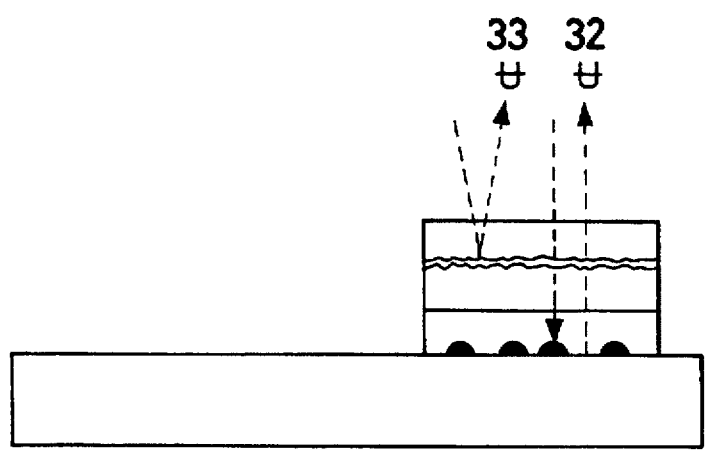
FIG. 10 is a schematic illustrating how to read the information-recorded medium shown in FIG. 9.

Hence, with the medium illuminated with infrared light from the uppermost relief hologram-formed layer 6 as shown in FIG. 10, the light reaches the printed portion 31 through the hologram-recorded layer 7 and block layer 11. The infrared light—absorbed according to the information on the printed layer that absorb infrared light and reflected by the substrate 2 that reflects infrared light—transmits back through the block layer 11 and hologram-recorded layer 7.

If an optical sensor 32 for sensing infrared light alone is located as shown and variable information such as mechanically readable bar codes, symbols or letters is used as the information recorded on the printed layer 3 that absorbs infrared light, it is then possible to read the information on the printed layer 3 with unattended processing equipment for cards, etc., thereby discriminating the multiplex information-recorded medium 1 such as a card from another.

The printed portion 31 of the medium shown in FIG. 9 is formed of the printed layer 3 that absorbs infrared light, but this may be obtained by infrared light-reflecting printing. In that case, a substrate that absorbs or transmits infrared light—which is obtained by using a resin material such as nylon, cellulose diacetate, polyvinyl chloride, polystyrene, polyethylene, polypropylene, polyester, polyimide and polycarbonate, or mixing this resin with a dye such as carbon black, blackened silver, cyanine dye, phthalocyanine dye, naphthoquinone dye, anthraquinone dye, or triphenylmethane dye—is used in place of the substrate 2 that reflects infrared light. In this connection, it is understood that the color of the block layer 11 is not necessarily limited to black, and so may be white or the like. However, it is not preferable that the block layer 11 is of a bright color, because the diffracted light from the light diffraction pattern is difficult to see, and because that information, when used as the information for identification, as will be described later, is difficult to read. It is also understood that plural items of information, not one item of information, may have been recorded on the relief hologram-formed layer 6 as by changing the angle of incidence of reference light in a multiplexed way.

Figure 11:
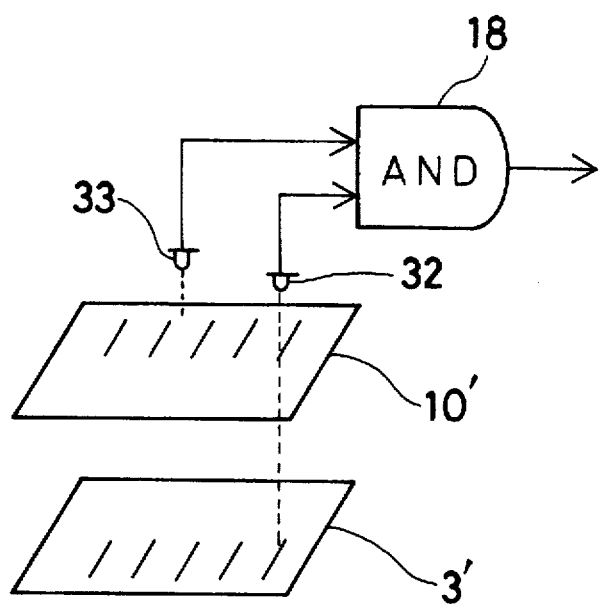
FIG. 11 is a schematic illustrating one example of the signal processing for identifying the information-recorded medium shown in FIG. 9.

The foregoing must be read on the assumption that the identification of the multiplex information-recorded medium by mechanical reading is achieved only by use of the information recorded on the infrared light-absorbing printed layer 3 below the block layer 11, and the information on the hologram-recorded layer 7 is used for identification by visual observation and as aesthetic or other information. However, much higher identification can be achieved by recording information for identification by mechanical reading in the hologram-recorded layer 7, and reading this information by another optical sensor 33 for synchronizing or collating it with the information on the printed layer 3 read by the optical sensor 32. One example of the signal processing taking place in that case is illustrated in FIG. 11. In this example, the same bar code pattern is used as the printed pattern 3' on the printed layer 3 and the information pattern 10' on the hologram-recorded layer 7. As can be seen from FIG. 11, the read signals obtained from both optical sensors 32 and 33 are inputted in an AND circuit 18. Only when both the signals coincide with each other, the identification signal is outputted. Hence, if either of the layers 7 and 3 is forged or falsified, the identification information can then be no longer read, making much better identification possible. In this connection, it is a matter of course that the information recorded on the layers 7 and 3 is not necessarily the same, and the processing of both the signals may be achieved by many other processing procedures as well; in other words, it is not limited to collation by an AND circuit, as mentioned above.

Figure 12:
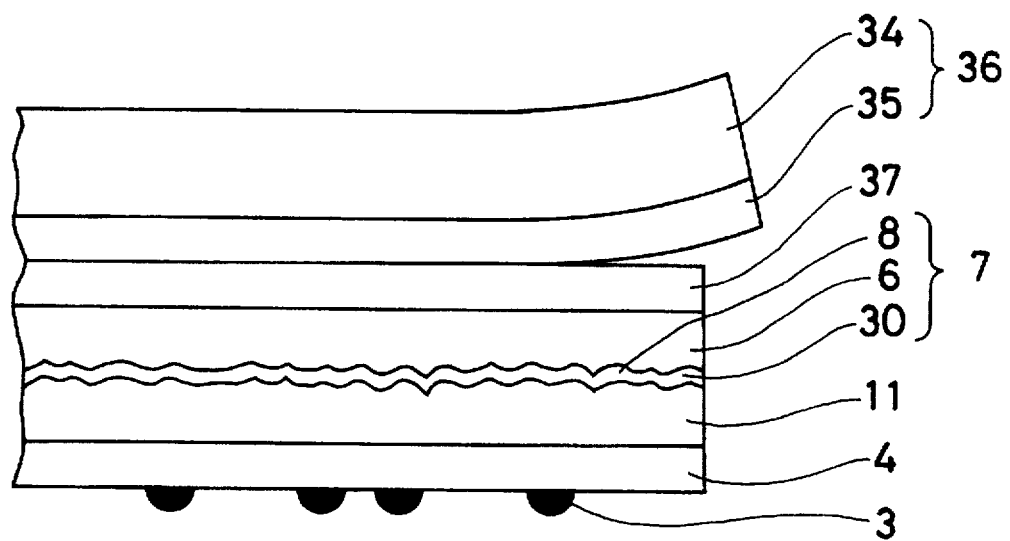
FIG. 12 is a sectional view of the information-recorded medium shown in FIG. 9 that is in a transfer sheet form.

While the invention has been described with reference to a card form of multiplex information-recorded medium, it is understood that a transfer sheet form of multiplex information recorded medium may be constructed by laminating a hologram-recorded layer 7, a block layer 11, an adhesive layer 4 and a printed layer 3 that absorbs infrared light on a releasable support member 36—which is made up of a transfer support 34 with a releasing layer 35 formed on one side—through a protective layer 37 in this order, as can be seen from FIG. 12. If the transfer support 34 itself possesses releasability, then the releasing layer 35 will be omitted, and if the hologram-recorded layer 7 itself is tough, then the protective layer will then be omitted.

For the transfer support 34, materials similar to those mentioned in connection with the substrate may be used.

For the releasing layer 35, a resin material less adhesive to the relief hologram-formed layer 6 or protective layer 37 may be used. By way of example only, mention is made of mixtures of polymethyl methacrylate with other thermoplastic resin, for instance, vinyl chloride-vinyl acetate copolymer, nitrocellulose resin, and polyethylene wax, or mixtures of cellulose acetate with a thermosetting type of acrylic resin or melamine resin.

The protective layer 37, for instance, may be formed by providing a synthetic resin film by lamination or extrusion coating, or coating a synthetic resin coating material. The protective layer 37 may be made releasable on the surface by the incorporation of silicone, etc., therein.

It is noted that if the printed portion comprising the printed layer 3 that absorbs infrared light is provided in the form of the lowermost layer, it is then possible to form the printed portion just before transfer, which provides the best location on which information for discrimination is to be formed.

Figure 13:
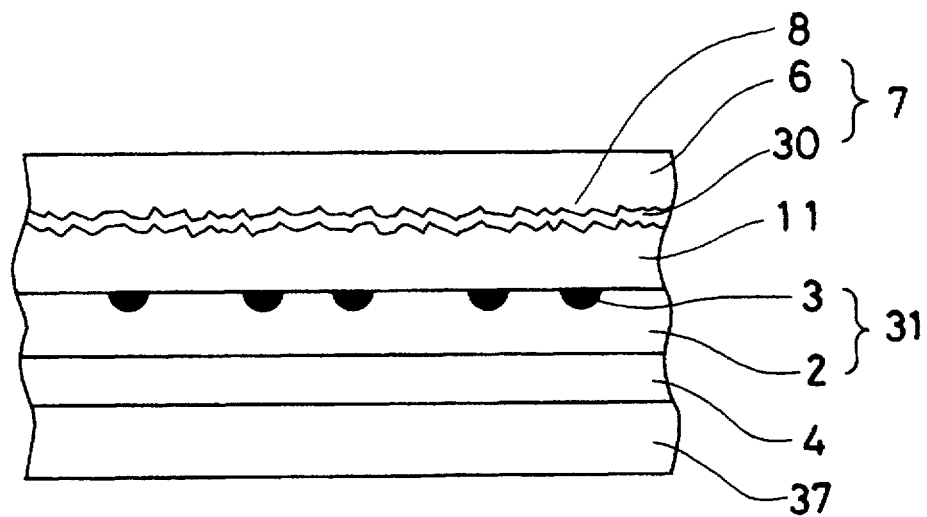
FIG. 13 is a sectional view of the information-recorded medium shown in FIG. 9 that is in a seal form.

As shown in FIG. 13, a seal form of medium may be formed by providing the releasable support member 37 on the side of the adhesive layer 4 opposite to the hologram-recorded layer 7. In this case, the adhesive layer 4 of the medium may be applied to an application member, while the releasable support member 37 is released from it.

Figure 14:
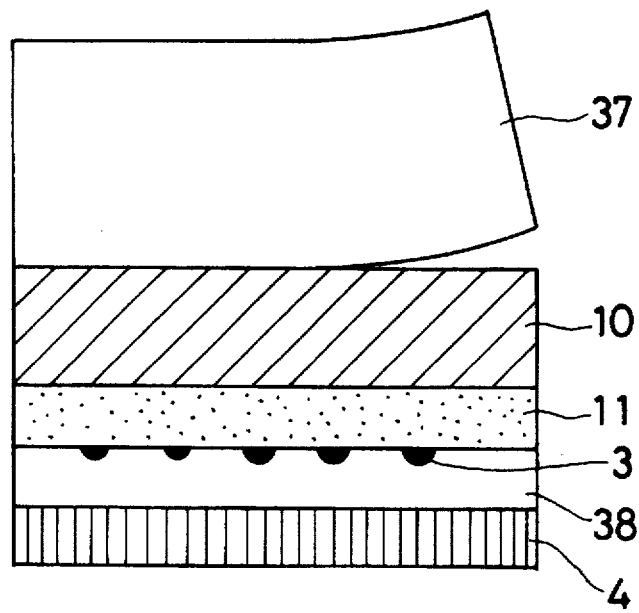
FIG. 14 is a sectional view of an example of another transfer sheet form of information-recorded medium according to the invention.

FIG. 14 is a sectional representation of another example of the transfer sheet form of multiplex information-recorded medium in accordance with the invention. As illustrated, a releasable support member 37 is provided thereon with a Lippmann hologram-formed layer 10 capable of being reconstructed at a visible wavelength $\lambda_1$, which is in turn provided thereon with a black block layer 11 that transmits infrared light and absorbs visible light. Then, a printed layer 3 formed by infrared light absorbing ink is provided on the side of the block layer 11 opposite to the hologram-formed layer 10, and is covered thereon with an infrared light reflecting layer 38, on which an adhesive layer 4 is in turn provided. When the releasable support 37 is released from the medium, while the adhesive layer 4 of the medium is applied to the substrate 2 of an application member such as a card, only the information recorded on the Lippmann hologram-formed layer 10 can be visually observed, but the information on the printed layer 3 below the block layer 11 remains invisible.

Therefore, when the medium is illuminated with infrared light having a wavelength $\lambda_2$ from the uppermost hologram-formed layer 10, the infrared light reaches the printed layer 3 through the hologram-formed layer 10 and block layer 11. The infrared light absorbed according to the information on the printed layer 3 and reflected by the reflecting layer 38 transmits back through the block layer 11 and the hologram-formed layer 10. If an optical sensor 16 for sensing only light having a wavelength $\lambda_2$ is located as shown and variable information such as mechanically readable bar codes, symbols and letters is used as the information on the printed layer 3, it is then possible to read the information on the printed layer 3 with unattended processing equipment for cards, etc., thereby individually discriminating the application member 2 such as a card from another.

In the medium shown in FIG. 14, the printed layer 3 is formed of infrared light absorbing ink, but this may be obtained by use of infrared light reflecting ink. In that case, an infrared light absorbing layer is used in place of the infrared light reflecting layer 38. The color of the block layer 11 is not necessarily black, and so may be white or the like. However, it is not preferable that the block layer 11 has high reflectivity with respect to the visible wavelength $\lambda_1$ reproduced from the Lippmann hologram-formed layer 10, because the information reconstructed from the hologram-formed layer 10 is difficult to see, and because that information, when used as identification information as will be described later, is difficult to read. Plural items of information, not one item of information, may have been recorded on the Lippmann hologram-formed layer 10 in a wavelength multiplexed manner.

The medium according to this example is designed on the assumption that the identification of the holographic information by mechanical reading is achieved only by use of the information recorded on the printed layer 3 below the block layer 11, and the information on the hologram-formed layer 10 is used for identification by visual observation and as aesthetic or other information. However, much better identification can be achieved by recording information for identification by mechanical reading in the hologram-formed layer 10, and reading this information by another optical sensor 17 for synchronizing or collating it with the information on the printed layer 3 read by the optical sensor 17. The signal processing takes place, as illustrated in FIG. 11. In this example, the same bar code pattern is used as the printed pattern 3' on the printed layer 3 and the information pattern 10' on the hologram-formed layer 10. As can be seen from FIG. 11, the read signals obtained from both optical sensors 16 and 17 are inputted in an AND circuit 18. Only when both the signals coincide with each other, the identification signal is outputted. Hence, if either of the layers 10 and 3 is forged or falsified, the identification information can then be no longer read, making much improved identification possible. In this connection, it is a matter of course that the information recorded on the layers 10 and 3 is not necessarily the same, and the processing of both the signals may be achieved by many other processing procedures as well; in other words, it is not limited to collation by an AND circuit, as mentioned above.

Figure 15:
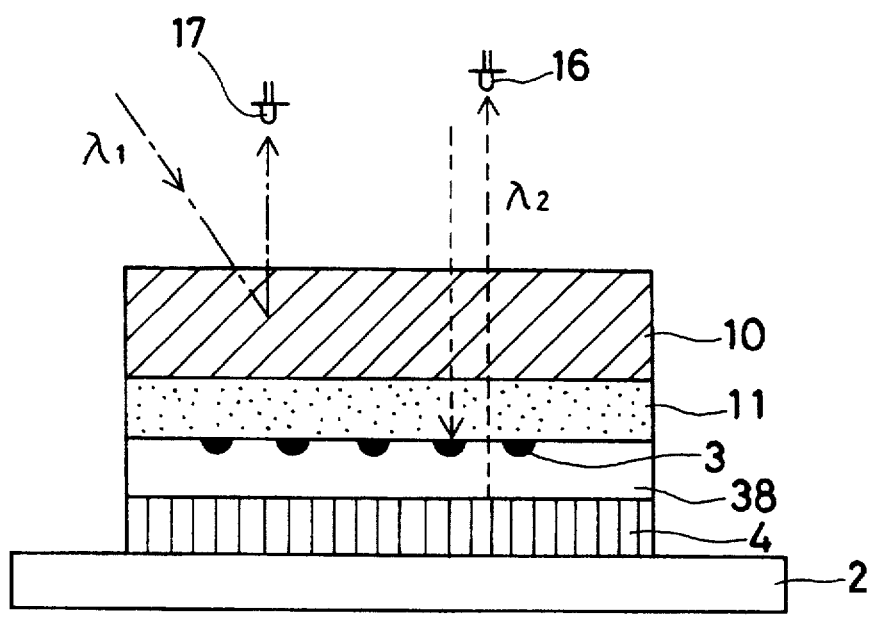
FIG. 15 is a schematic showing the transfer sheet shown in FIG. 14 which is applied onto an application member.
Figure 16:
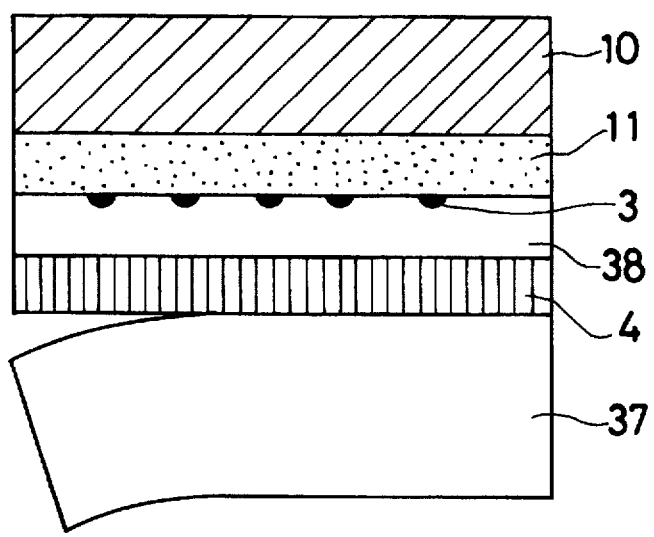
FIG. 16 is a sectional view of an example of another seal form of information-recorded medium according to the invention.

Here, too, the medium may be provided in a seal form by forming the releasable support member 37 on the side of the adhesive layer 4 opposite to the hologram-formed layer 10, as shown in FIG. 16. In this case, the medium is applied onto the application member 1 by the adhesive layer 4, while the releasable support 37 is released from the medium (FIG. 15).

An example of the multiplex information-recorded medium according to the invention in which a composite member comprising a diffraction grating and a hologram is formed on a printed layer will now be explained.

Figure 17:
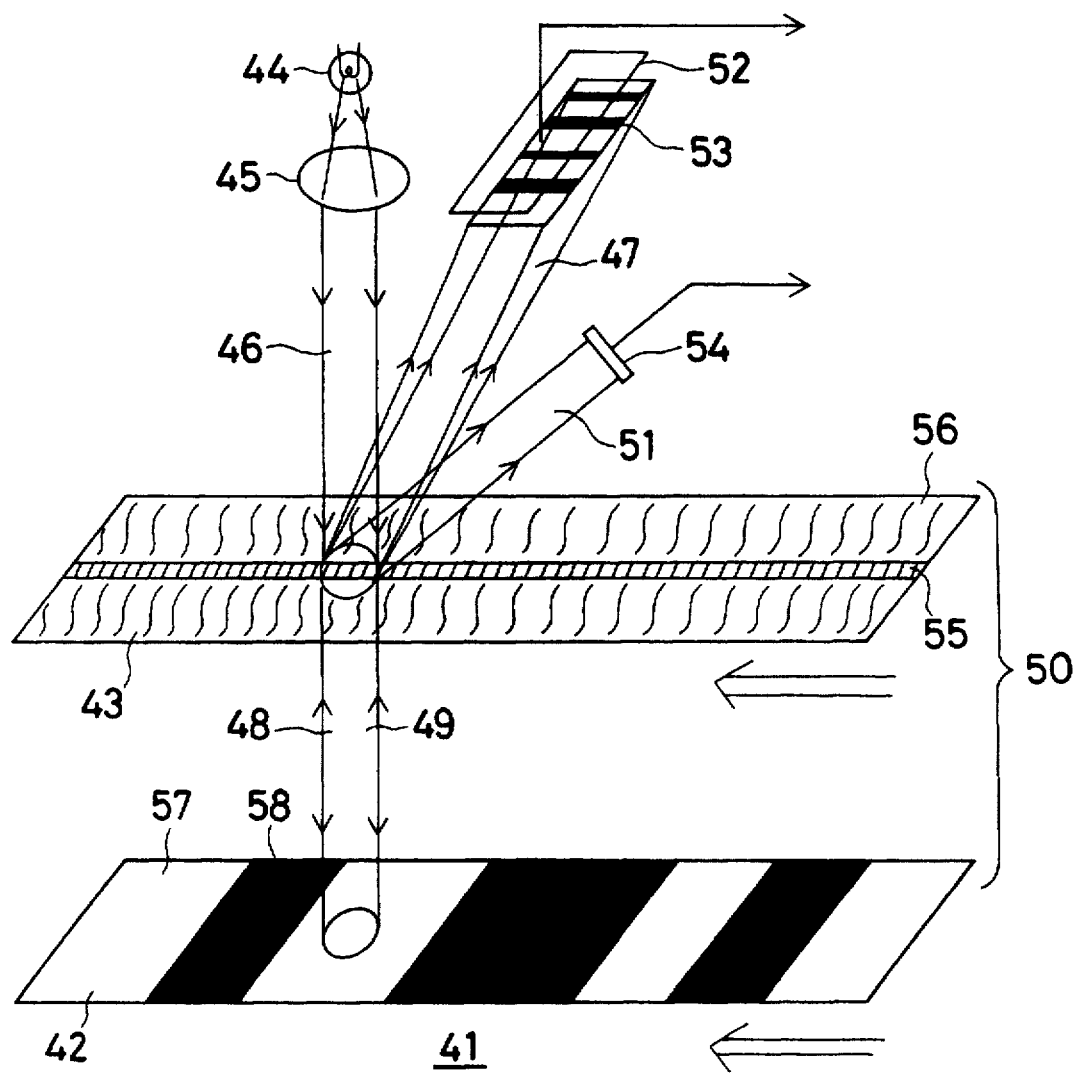
FIG. 17 is an exploded perspective showing the basic construction of yet another example of the information-recorded medium and an arrangement for reading it.

FIG. 17 is an exploded perspective representation showing the basic construction of the information-recorded medium according to this example and a read arrangement used therewith. The information-recorded medium according to this example, shown at 50, is built up of a substrate 41 with the surface reflecting light regularly, a code portion 42 formed on that surface, on which photoelectrically readable information such as bar codes is recorded, and a diffraction grating-hologram composite member 43 that is integrally formed on the code portion 42. The diffraction grating-hologram composite member 43 is composed of a combination of a transmission type diffracting grating 55 with a Fresnel hologram 56 on which photoelectrically readable information that may again be bar codes is recorded. How to combine them will be described later.

To read the information-recorded medium 50, light leaving a light source 44 is focused through an optical system 45 such as a lens. Then, upon the surface of the substrate 41 of the medium 50 illuminated with the resultant convergent light 46, a part of that light strikes upon the hologram 56 of the composite member 43, and light 47 reflected and diffracted by the hologram 56 reconstructs information 53 recorded at a given position. Hence, if a line or image sensor 52 is located at the reconstruction position, as shown, it is then possible to read the information, such as bar codes, recorded on the hologram 56. In this regard, it is noted that the diffraction grating-hologram composite member 43 comprising a combination of the diffraction grating 55 with the hologram 56 is difficult to forge or falsify. Even though it may be forged, it cannot be read by the sensor 52 and so is shown to be a forgery. However, this is not true of when the hologram 56 is faithfully prepared.

Figure 18:
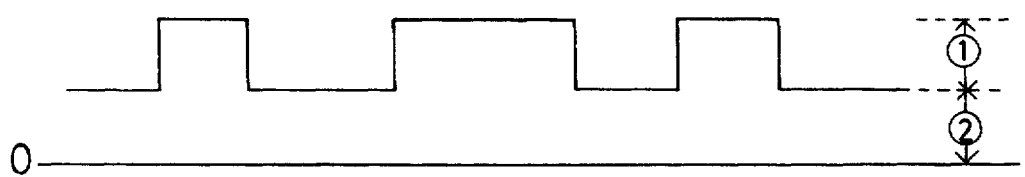
FIG. 18 is a waveform schematic showing a read signal.

Light 48 passing through the diffraction grating-hologram composite member 43 is incident on the code portion 42. The incident light 48 is absorbed by an absorbing region 58 on the code portion 42 without being reflected thereby, and it is reflected from the surface of the substrate 41 at a reflecting region 57. The reflected light 49 travels in the direction opposite to that of the incident light through the composite member 43, and is diffracted toward a given direction determined by the pitch and direction of the diffraction grating 55. The diffracted light 51 is received by a light receptor element 54 located at the incident position for photoelectric conversion. The receptor element 54 also receives a part of the convergent light 46 diffracted directly by the diffraction grating 55. Therefore, when the information-recorded medium 50 is relatively moved in a direction shown by an arrow, the light 51 mentioned above is superimposed on a part of the convergent light 46 diffracted directly by the diffraction grating 55 for photoelectric conversion, so that a signal, shown in FIG. 18, can be produced. In this signal waveform, a part shown by (2) can be constantly detected irrespective of the reflecting and absorbing regions 57 and 58 on the code 42, and a part (1) that overlies that signal part (2) represents the information of the code portion 42. Therefore, it is possible to read the information of the code portion 42 by cutting out the constant part (2) of the signal produced by the receptor element 54 and detecting the remaining part (1). In other words, only by use of reader equipment in which light source 44, optical system 45, receptor element 54 and the mechanism (not shown) for moving the information-recorded medium 50 are relatively arranged in such a way that it conforms to the angle and direction of diffraction of the diffracted light 51 is it possible to read the information of the code portion 42. This is by no means achievable with the use of other reader equipment. If the code portion 42 should be forged or falsified, the information will be incapable of being read by the above-mentioned reader and so be shown to be a forgery. However, this is not true of when the diffracting grating 55 is modified to have a given angle and direction of diffraction.

According to this example wherein separate items of information are recorded on the Fresnel hologram 56 and code portion 42 of the diffraction grating-hologram composite member 43 in the information-recorded member 50 for separate reading with the light coming from the single light source 44, the amount of the information to be recorded is much increased. Besides, it is very difficult, if not impossible, to forge the composite member 43 faithfully, as already mentioned. Moreover, this effect on preventing forgery may be further increased by allowing the information recorded on the hologram 56 to have some correlation with that on the code portion 42.

In connection with this example, it is noted that the hologram 56 may be omitted from the diffraction grating-hologram composite member 43. In this case, the information of the code portion 42 may be read by the output of the receptor element 54.

Returning back to the diffraction grating-hologram composite member 43, it may be built up of fine regions of the transmission type diffraction grating 55 and fine regions of the hologram 56 which are arranged in parallel with each other along the direction of movement of the information-recorded medium 50 as shown by an arrow in FIG. 17. Alternatively, it may be composed of an alternate arrangement of fine regions of the grating 55 and hologram 56, which traverse the direction of movement of the medium 50. Still alternatively, it may be composed of a combination of the transmission type diffraction grating 55 and hologram 56 recorded in a multiplexed manner, or a combination of the transmission type diffracting grating 55 and hologram 56 superimposed one upon another. Of importance for such a parallel arrangement is that the diffraction grating 55 and hologram 56 always exist in the section of the light beam 46, irrespective of in which direction the information-recorded medium 50 moves. Another important factor is that the diameter of the light beam 46 must be smaller than the minimum width of the information recorded on the code portion 42. In other words, the parallel juxtaposed diffraction grating 55 and hologram 56 must always exist within the area of the composite member 43 with the diameter smaller than the minimum width of the information recorded on the code portion 42.

The transmission type diffraction rating 55 of the diffraction grating-hologram composite member 43 may be of a uniform transmission type with the grating or interference fringes having a given pitch. Alternatively, it may be either a transmission type of composite diffraction grating composed of a combination of plural diffraction gratings or a transmission type hologram having lens action. Here the "transmission type diffraction grating or hologram" is understood to refer to a relief type of diffraction grating or hologram having a relief pattern corresponding to grating or interference fringes on the lower or upper surface of a layer on which the diffraction grating is to be formed. On the relief surface there may be formed a thin layer with the index of refraction different from that of the diffraction grating-formed layer, too. When the diffraction grating-formed layer has a relief pattern on its lower surface, this layer may have a refractive index different from those of adhesive, block and other layers located below it; in other words, it is not necessary to use such a thin layer as mentioned above. Alternatively, a phase and transmission type of diffraction grating or hologram may be used in lieu of the relief type of diffraction grating or hologram. It is noted that while the diffraction grating 55 may be photographically produced by holographic interference of two light beams, it is desired that the composite diffraction grating or the hologram having lens action be produced as by electron or laser beam graphic techniques. An original plate having a given relief pattern, after being prepared in this manner, is embossed in the diffraction grating-formed layer.

The hologram 56 of the diffraction grating-hologram composite member 43 is a reflection type of Fresnel hologram, and may be of either a transparent reflection type hologram that can be seen through or an opaque reflection type hologram. In such a reflection type hologram, the layer on which a hologram is to be formed may include a relief pattern corresponding to interference fringes on its lower or upper surface, said relief surface being provided thereon with a transparent thin layer with the index of refraction different from that of the hologram-formed layer. Alternatively, a transparent or opaque relief reflection type hologram may be produced by the provision of a reflective, or semi-transmitting reflective metallic layer or a reflection type of interference layer. When the hologram-formed layer has a relief pattern on its lower surface, it may have a refractive index different in the index of refraction from an adhesive layer, a block layer, etc. located below the hologram-formed layer and, instead, such a transparent thin layer, reflective or semi-transmitting metallic layer or a reflection type of interference layer is not provided. In place of the relief type hologram, a phase and transmission type of hologram may be used as well.

It is noted that when the fine region of the transmission type of diffraction grating 55 and the fine region of the hologram 56 are juxtaposed with each other to make the diffraction grating-hologram composite member 43, as shown in FIG. 17, it is desired that both the regions be of the same layer structure in view of fabrication.

Figure 19:
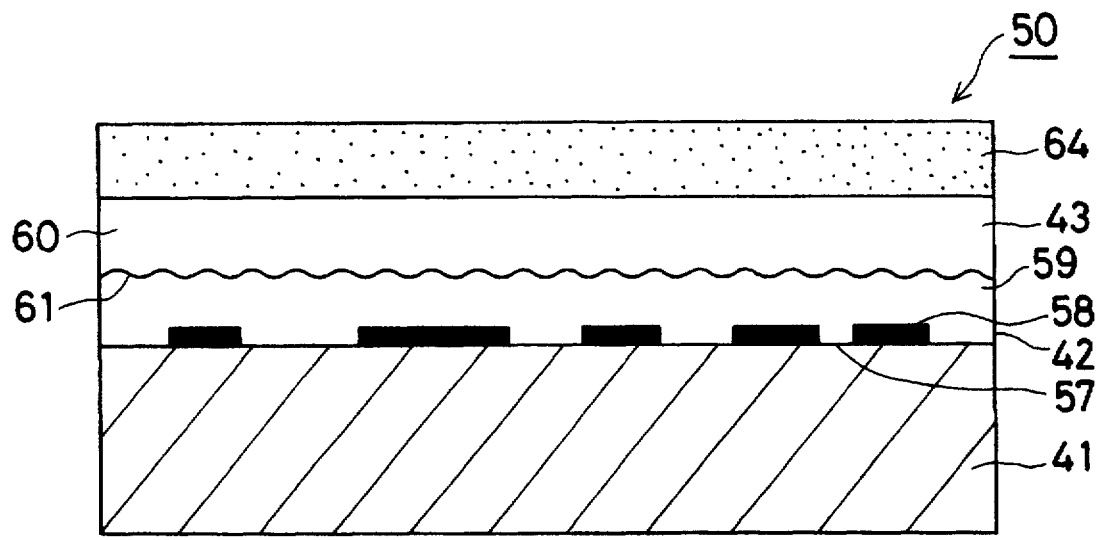
FIG. 19 is a sectional view of an example of the information-recorded medium shown in FIG. 17, which is in a card form.
Figure 20:
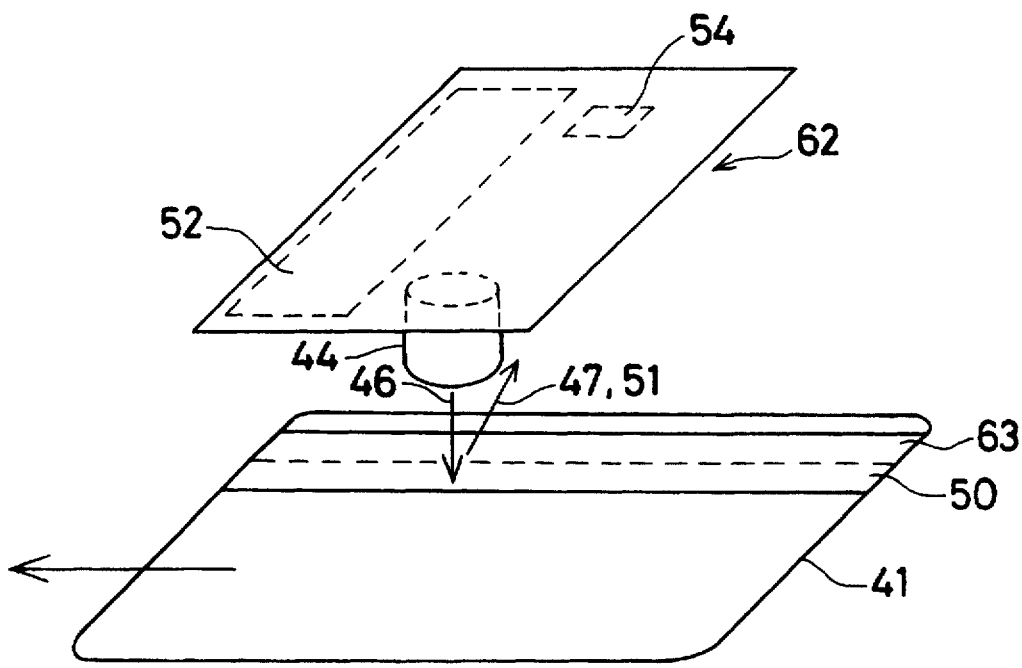
FIG. 20 is a perspective showing the card shown in FIG. 19 and an arrangement for reading it.

FIG. 19 is a sectional schematic of one example of a card form of information-recorded medium that is used on the principle mentioned above, while it is moving in the read direction. An information-recorded portion 50 according to the invention, which is built up of a code portion 42 and a diffraction grating-hologram composite member 43 integrally formed thereon, is located on a given surface position on a card 41. As illustrated in FIG. 20 (a perspective view) by way of example alone, the portion 50 is located along or below a magnetic stripe region 63 for magnetic recording in such a way that it extends along the direction of movement of the card 41 in a striped configuration. Bar-code information is recorded on the code portion 42, and intersects the direction of movement of the card 41.

The card substrate 41 may be provided on the surface with a metallic reflecting layer such as an aluminum layer, or may have a glossy surface that reflects light regularly. The bar-code information 42 comprising a light absorbing region 58 is printed on the surface of the card substrate 42 to define information comprising a light reflecting region 57 and the absorbing region 58. As will be described later, when reading light leaving a light source 44 is infrared rays, the bar-code information 42 is to be printed on the card with the use of infrared absorbing ink. This bar-code information 42 may be formed by a reflective material such as a metallic film, too. In this case, the surface of the card 41 may be provided with a layer capable of absorbing reading light, or may be designed to scatter the light.

The code portion 42 is provided thereon with the diffraction grating-hologram composite member 43 through a self-adhesive or adhesive layer 59. In the diffraction grating-hologram composite member 43 used in this arrangement, a fine region of a transmission type of diffraction grating 55 and a fine region of a hologram 56 are juxtaposed with each other, as explained in connection with FIG. 17. The diffraction grating 55 and hologram 56 are produced by a parallel arrangement of a relief pattern 61 corresponding to their grating and interference fringes on the lower surface of a common layer 60 to be provided thereon with the relief pattern. The relief pattern-formed layer 60 used has a refractive index different from that of the layer 59. Therefore, the information 53 recorded on the hologram 56 is reconstructed by light 47 reflected and diffracted due to Fresnel reflection from the relief pattern 61 (see FIG. 17), while light 49 reflected from the reflecting region 57 due to transmission and diffraction through the relief pattern 61 is diffracted toward a light receptor element 54 (again see FIG. 17).

A block layer 64 is then provided on the diffraction grating-hologram composite member 43. The block layer 64 is layer made up of a material that absorbs or scatters light in the visible region, rather than transmitting it, and transmits the reading light, e.g., light in the infrared region, and is provided to prevent the information on the composite member 43 and code portion 42, located therebelow, from being visually read.

In this example constructed as mentioned above, when the information-recorded portion 50 of the card 41 is read by visible light, the information recorded on the diffraction grating-hologram composite member 43 and the code portion 42 is shut out by the block layer 64, and so is invisible to the human naked eye. In order to read the information recorded on the information-recorded portion 50 on the basis of the principle explained with reference to FIGS. 17 and 18, light that leaves the light source 44 and transmits through the block layer 64, e.g., infrared rays 46 are caused to strike on the card 41 in the arrangement shown in FIGS. 17 and 20. Then, the bar code recorded on the composite member 43 is detected by the line or image sensor 52, and the bar code recorded on the code portion 42 by the receptor element 54. In connection with FIG. 19, it is understood that the block layer 64 may be located below, not on, the diffraction grating-hologram composite member 43. Alternatively, the layer 60 itself may be formed into a block layer. If the recorded medium is in the form of a credit card, etc., it is then possible to locate the information-recorded portion 50 adjacent to the magnetic stripe 63, thereby forming the block layer 64 that is of the same color as the magnetic stripe or the protective layer thereof.

Reference will now be made to one example of the invention wherein the effect on preventing forgery and falsification is further enhanced by correlating the code information recorded on the code portion 42 with that on the diffraction grating-hologram composite member 43. FIG. 21 is an illustrative schematic of the case where reading is done by the relative movement of a reader 62 built up of a light source 44, a line or image sensor 52 and a light receptor element 54 in the direction shown by an arrow. In FIG. 21, a code portion 42 forming a layer 50 with information recorded on it, a diffraction grating-hologram composite member 43, a signal obtained from the receptor element 54, and a bar code read by the line or image sensor 52 are illustrated in a parallel configuration. The actual layer structure is illustrated in FIG. 19, in which the code portion 42, diffraction grating-hologram composite member 43 and block layer 64 are shown to be integrally stacked on the surface of the card substrate 41 in this order.

This example is characterized by using an ITF bar code composed of sets of bars, each set (or unit) consisting of two thick bars $58_1$ and a plurality of thin bars $58_2$, for the code portion 42. It is only when the reading light 46 reaches the locations of the two thick bars $58_1$ of the ITF bar code that the bar code recorded on the hologram 56 of the diffraction grating-hologram composite member 43 can be read. This example is also characterized in that the composite member 43 is divided into a multiplicity of zones A–G in the reading direction, on which different bar codes are recorded. On the basis of the information read from the code portion 42, any one of the zones A–G on the composite member 43 is selected, so that the information reconstructed therefrom can be used as the information for card discrimination, thereby preventing forgery and falsification.

When the reflecting region 57 of the code portion 42 is located at the read position, a pseudo image or other defects are likely to occur, because light passing straightforward through the diffraction grating 55 and hologram 56 is reflected by the region 57, and re-enters the diffraction grating 55 and hologram 56. As a result, some noise is likely to enter the line or image sensor 52. In contrast, when the absorbing region 58 is located at the read position, such a pseudo image is unlikely to occur, because light passing straightforward through the diffraction grating 55 and hologram 56 is absorbed in the absorbing region 58, and this makes it possible to read the information recorded on the hologram 56 with a more increased accuracy. Therefore, when the signal from the light receptor element 54 is at a low level and located at the position of the thick bars $58_1$ with the time (width) being long, it is possible to read the bar code read by the line or image sensor 52 as the bar code recorded on the hologram 56. In this regard, it is preferable that recording is done with the direction of the bar code recorded on the hologram being parallel with the reading direction, as shown in FIG. 21, because it is then possible to increase the reading time with an increased read accuracy.

As already noted, the ITF bar code used for the code portion 42 is composed of sets of bars, each consisting of two thick bars $58_1$ and a plurality of fine bards $58_2$. Whenever one code information is read, the two thick bars $58_1$ are sequentially located at the read position. Therefore, the strength of the output from the line or image sensor 52, which is obtained when the first thick bar $58_1$ is read, is fed back to the intensity of the light source 44 or the sensitivity of the line or image sensor 52, whereby the accuracy, with which the hologram 56 is read when the next thick bar $58_1$ reaches the read position, can be improved. In other words, the code information recorded on the hologram 56 can be accurately read by reading one unit of the ITF bar code of the code portion 42, while the intensity of the light 47 used for reading the first thick bar $58_1$ is used to optimize the intensity of the reading light 46 at the time of reading the next thick bar $58_1$ or optimize the sensitivity of the line or image sensor 52. This is to correct variations in the strength and contrast of the bar code recorded on the zones A–G of the hologram 56—to be explained just below, if they occur depending on recording or other conditions.

Returning again back to the example shown in FIG. 21, the diffraction grating-hologram composite member 43 is divided into a multiplicity of zones A–G, on which different bar codes are recorded. Such a composite member 43 having a multiplicity of zones may be provided in a tape form. This tape form of composite member 43 is cut at any desired position per card into a piece of given length, which is applied onto the ITF bar code of the code portion 42 to make an information-recorded medium 50. The probability that the information-bearing codes on the given zones of these media, e.g., the third zones C from left, coincide with each other, is very low. Which zone is selected out of the zones A–G may be determined on the basis of the information read from the code portion 42, and the information reconstructed from, e.g., the zone C may be used as the discrimination information for that card. If this is done, therefore, it is nearly impossible to forge or falsify each of these media 50.

It is noted that the degree of such multiplexing of recorded information and the degree of security achieved by the correlation mentioned above can be further enhanced by using a composite diffraction grating as the diffraction grating 55 or causing code information to correspond to that composite diffraction grating.

Here a Lippmann hologram will be explained. This is produced, when object light is incident on one side of an optical recording material such as silver salt photographic film or photopolymer and reference light is incident on the other side. Interference fringes having a transmission or refractive index distribution are recorded, with an interference fringe spacing d, in the thickness-wise direction of the optical recording material. Calling d the spacing between the interference fringes, $\lambda$ the wavelength, n the refractive index of the optical recording material and $\theta$ the angle between object light and reference light, we have the relation $$d=\lambda/(2n\cdot\sin\theta/2) \tag{1}$$

With white light incident on the thus recorded Lippmann hologram, only light of wavelength $\lambda$ is diffracted, so that the recorded information can be reconstructed.

As well known in the art, the spacing d between the interference fringes of such a Lippmann hologram can be made wide or narrow after recording. In the case of silver salt photographic film by way of example alone, the spacing d becomes wide when swollen with D-sorbitol after recording. In contrast, when swollen, exposed to light for recording and treated for removal of the swelling agent, the spacing d in silver salt photographic film becomes narrow. With the spacing d made wide or narrow by such processings, there is generally a change in the inclination of the interference fringes.

As the spacing between the interference fringes changes upon recording, the spacing between the interference fringes upon reconstructed changes from d represented by Formula (1) to d' with the wavelength $\lambda$' reconstructed varying from the recording wavelength $\lambda$. As the spacing becomes wide, the wavelength becomes long, and as the spacing becomes narrow, the wavelength becomes short.

By making use of such phenomena mentioned above, it is possible to write information for preventing forgery, etc., onto the layers 10 of the multiplex information-recorded media mentioned above, on which Lippmann holograms are recorded. This will now be explained with reference to some examples.

FIGS. 22(a)–(d) comprise a representation of a general process of, and the action achieved by, enlarging the spacings between interference fringes in a portion of the Lippmann hologram that corresponds to the information to be recorded. As shown in FIG. 22(a), object light 24 is incident on one side of a holographic recording material 23 built up of a substrate 20 and a silver salt photographic emulsion layer 22 coated on the surface of the substrate 20, and reference light 25 is incident on the other side, thereby recording interference fringes 26. After development, swelling ink comprising D-sorbitol, etc., is applied by printing 27 onto the Lippmann hologram 22 to express variable information to be recorded later, such as numbers, letters, codes or patterns, as shown in FIG. 22(b). The application of the swelling ink to the hologram 22 may also be achieved by other means such as transfer. The thus applied swelling ink permeates through the hologram 22 to swell its layer. As can be seen from FIG. 22(c) FIG. 22(d), a partially exaggerated view of FIG. 22(c), the spacings between the interference fringes 22 become wide at the printed locations 27, with the inclinations of the interference fringes 26 varying. Upon white reading light 28 incident on the Lippmann hologram 22 in which the interference fringes 26 at the printed locations 27 are swollen, the information recorded on the Lippmann hologram is reconstructed in the color of the recording wavelength $\lambda$, while the information on the Lippmann hologram is reconstructed from the printed locations 27 at a wavelength λ' longer than the recording wavelength λ in a different direction, as shown in FIG. 22(c). Therefore, the additionally written numbers, letters, codes, patterns, etc., can be identified by the contours of the locations having varying read wavelengths. Moreover, since the spacings between the interference fringes 26 vary continuously from the additionally written locations, there is a continuous change in the color reconstructed from the hologram; in other words, the hologram becomes excellent in design.

Now assume that another recording material is superimposed on the Lippmann hologram with such information additionally written on it so as to duplicate it with the use of a light source of wavelength λ. The locations with the additional information will not be copied, and so the duplicate will remain lacking in that additional information. This is equivalent to saying that it is impossible to make a copy of the original. Moreover, since the erasure or addition of the additional information causes the holographic information to have some defects, forgery or falsification, if attempted, can be immediately found out. This is because the holographic information and the additionally written information are formed by the same continuous interference fringes.

In the case of the silver salt photographic emulsion, it is possible to enlarge the spacings between interference fringes in a given location of a Lippmann hologram by carrying out printing with the use of a swelling solution such as D-sorbitol, as mentioned above. It is understood, however, that even when bichromated gelatin is used as the holographic recording material, ink comprising a swelling solution may be used as well. Moreover, when a photopolymer is used as the holographic recording material, the required location thereof may be printed with the use of solvents, plasticizers, monomers, or the like, thereby enabling interference fringes in that portion to be selectively swollen.

Figure 23A:
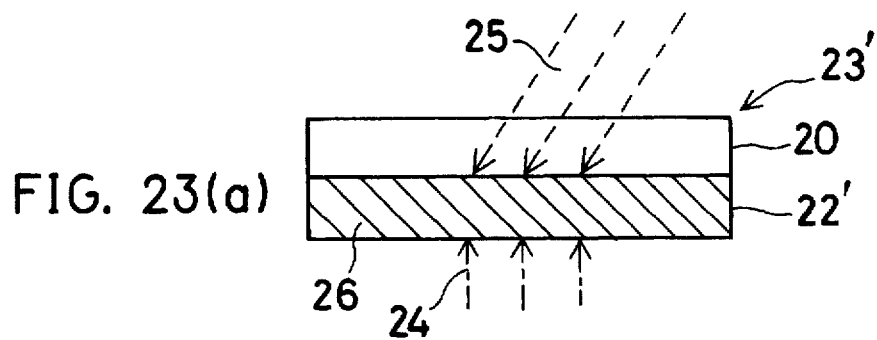
FIGS. 23(a)–(d) comprise a schematic illustrating the process of, and the action achieved by, making narrow the spacings between interference fringes of a Lippmann hologram.
Figure 23B:
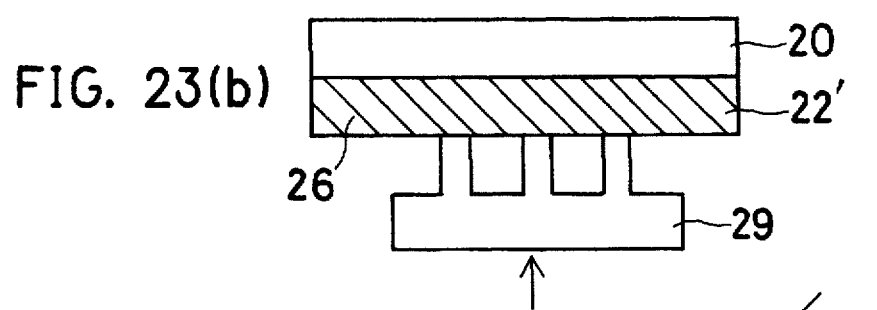
Figure 23C:
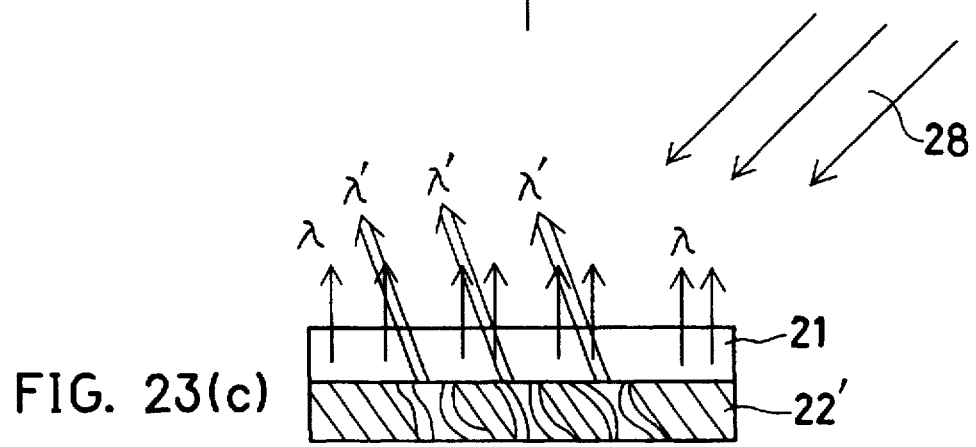
Figure 23D:
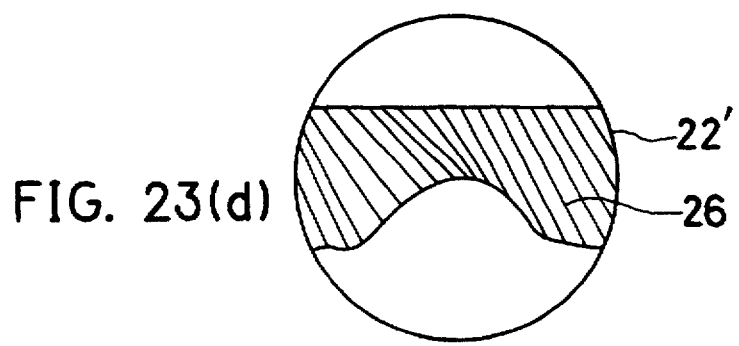

A general process of, and the action achieved by, narrowing the spacings between interference fringes in a location corresponding to additionally written information will be explained with reference to FIGS. 23(a)–(d). As shown in FIG. 23(a), the interference of object light 24 and reference light 25 is used to record interference fringes 26 in a holographic recording material 23' that is prepared by coating a photopolymer 22' on the surface of a substrate 20. Then, an embosser 29 having the information to be additionally written is pressed hot on the thus recorded Lippmann hologram 22', as shown in FIG. 23(b). The spacings between the thus pressed interference fringes 26 become narrow, with the inclinations of the interference fringes 26 varying, as can be seen FIG. 23(d), a partly exaggerated portion of FIG. 23(c). Upon white reading light 28 incident on the Lippmann hologram 22' with some interference fringes 26 contracted, the information recorded on the Lippmann hologram is reconstructed in the color of recording wavelength λ from the unpressed interference fringes, while the information recorded on the Lippmann hologram is reconstructed at a wavelength λ' shorter than recording wavelength λ in a different direction, as can be seen from FIG. 23(c). As in the case shown in FIGS. 22(a)–(d), therefore, the additionally written numbers, letters, patterns, or the like can be identified from the contours of the portions having varying read wavelengths. Moreover, since the spacings between the interference fringes 26 vary continuously from the additionally written location to the periphery, the hologram becomes excellent in design. Here, too, it is possible to prevent forgery or falsification.

In connection with the process shown in FIGS. 23(a)–(d), it is noted that if the application of mechanical pressing alone gives rise to a change in the spacings between interference fringes, heating will not always be needed.

Referring then to another process of narrowing the spacings between interference fringes, a holographic recording material is overall swollen with the use of a swelling agent or other solvent, plasticizer or monomer prior to recording the interference fringes. The interference fringes are then recorded on the recording material. Following this, the material is partly washed and extracted from the additionally written location with the swelling agent or solvent, so that the spacings between the interference fringes can be made narrow. As in the processes shown in FIGS. 22(a)–(d) and FIGS. 23(a)–(d), therefore, the additionally written information can be identified by the contours of the portions having varying reading wavelengths. Moreover, the hologram becomes excellent in design. Here, too, it is possible to prevent forgery or falsification.

It is further possible to use the process of making the spacings between interference fringes partly wide in combination with the processes of making them partly narrow. When a Lippmann hologram is recorded in a multiplexed manner, these processes may be applied to a part, or the whole, of the hologram.

Some problem occurs if the swelling process shown in FIGS. 22(a)–(d) is applied. This is because the quantity of swelling depends on the concentration and molecular weight of the solution used, the amount of the solution coated, and the thickness of the swelling film, rendering precise control of reading wavelength so difficult that no sufficient reproducibility can be achieved. The once swollen interference fringes also offer a poor stability problem in that when again exposed to water or a solvent, the swelling solution comes out of the interference fringes, or the plasticizer and the like are likely to come out of the interference fringes due to drying.

According to the invention, precise control of reading wavelength can be achieved by making use of swelling film obtained by mixing a monomer or oligomer, a photopolymerization initiator, etc., with a binder polymer. This swelling film is irradiated with a given quantity of light before or after it is brought in close contact with a photosensitive material with interference fringes recorded on it, e.g., a photopolymer, thereby polymerizing a given portion of the monomer or oligomer contained in the swelling film for inactivation. The amount of another portion of the monomer or oligomer is then regulated. Following this, this amount of the monomer or oligomer is diffused into the photosensitive material with interference fringes recorded on it, thereby achieving swelling and so regulating the interference fringe distance to any desired value.

After swelling by such a process, the photosensitive material with interference fringes recorded on it is irradiated with light or heated, so that the diffusing monomer or oligomer can be fixed within the interference fringes. It is thus possible to obtain a hologram that is excellent in the storage stability of the color to be reconstructed.

For stable and precise swelling, only the lamination of the film form of swelling material to the hologram is needed, followed by irradiation with light. Thus, this process is much easier to carry out, and is excellent in reproducibility as well.

According to the invention, a color pattern may also be formed on a hologram by allowing illumination light to have a distribution.

Figure 24A:
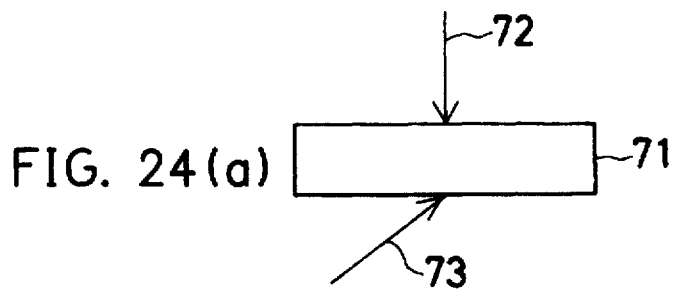
FIGS. 24(a)–(c) and (d1)–(d3) comprise a schematic illustrating the steps of one process for swelling a hologram according to the invention.
Figure 24B:
Figure 24C:
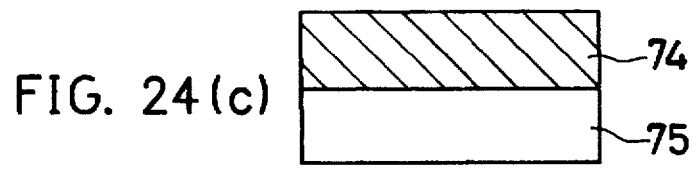
Figure 24:
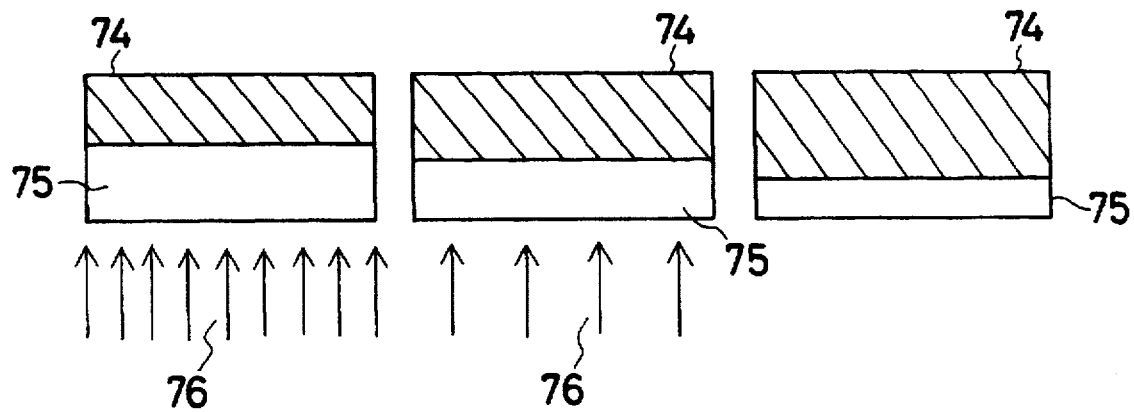

This holographic process will be explained in more detail with reference to FIGS. 24–26. FIGS. 24(a)–(c) and (d1)–(d3) illustrate the case where swelling film is first brought into close contact with a photosensitive material, and then exposed to light, thereby inactivating the swelling agent (monomer or oligomer) contained in the swelling film, and FIGS. 25(a)–(b), (c1)–(c3) and (d1)–(d3) illustrate the case where swelling film is exposed to light before it is brought into close contact with a photosensitive material, thereby inactivating the swelling agent contained in the swelling film. In the case shown in FIG. 24, object light 72 and reference light 73 are caused to strike on both sides of a photosensitive material 71 such as a photopolymer so as to record interference fringes therein, as shown in FIG. 24(a). As a result, such a Lippmann hologram as shown in FIG. 24(b) is obtained. Then, as shown in FIG. 24(c), swelling film 75 obtained by mixing a monomer or oligomer, a photopolymerization initiator, etc., with a binder polymer is brought into close contact with the Lippmann hologram 74. Following this, the hologram 74 or the swelling film 75 is irradiated with light 76 prior to, or simultaneously with, heating that is carried out so as to increase the degree of diffusion of the permeable monomer or oligomer into the swelling film 75, as shown in FIGS. 24(d1)–(d3). This irradiation with light 76 causes a part, or the whole, of the active, permeable monomer or oligomer in the swelling film 75 to be polymerized at a proportion corresponding to the quantity of light 76, so that it can be inactivated and, hence, loss permeability (diffusing power). In the case shown FIG. 24(d1) where the quantity of light 76 is large, therefore, a substantial part of the active, permeable monomer or oligomer is cleared of the swelling film 75; in other words, it is substantially unlikely to diffuse into the hologram 74 even upon heated. For instance, now consider the case where the Lippmann hologram 74 is recorded at the blue wavelength in FIG. 24(a). The hologram 74 is not substantially swollen at the swelling step shown in FIG. 24(d1), so that it can be reconstructed with the diffraction of blue light. In the situation (shown in FIG. 24(d2)) where the quantity of light 76 is medium, in contrast, about half the active, permeable monomer or oligomer in the swelling film 75 is inactivated. Upon being heated, the remaining half permeates into the hologram 74 for medium swelling. For this reason, the hologram 74 treated at the swelling step shown in FIG. 24(d2) is reconstructed with the diffraction of green light with the wavelength longer than the blue wavelength. In the situation shown in FIG. 24(d3) where the swelling film is not exposed to light 76, the active, permeable monomer or oligomer remains intact in the swelling film 75. Upon heating, nearly all of the permeable monomer or oligomer permeates into the hologram 74 where it is swollen to the maximum. For this reason, the hologram 74 treated at the swelling step shown in FIG. 24(d3) is reconstructed with the diffraction of red light having a wavelength longer than the green wavelength. Thus, the color to be reconstructed can be controlled between red and blue by regulating the quantity of light 76 exposed to the swelling film 75 in close contact with the hologram 74.

Figure 25A:
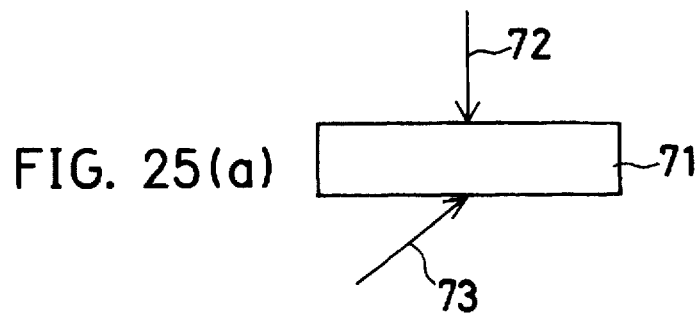
FIGS. 25(a)–(b), (c1)–(c3) and (d1)–(d3) comprise a schematic illustrating another process for swelling a hologram according to the invention.
Figure 25B:
Figure 25:
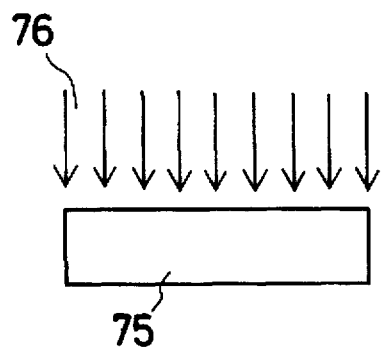
Figure 25:
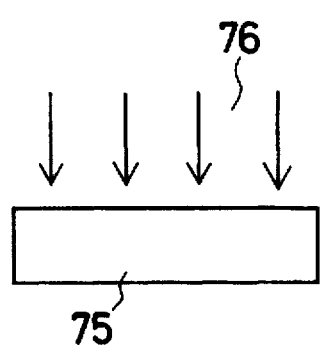
Figure 25:
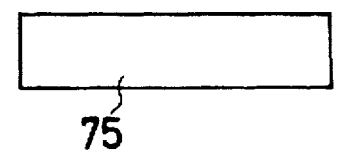
Figure 25:
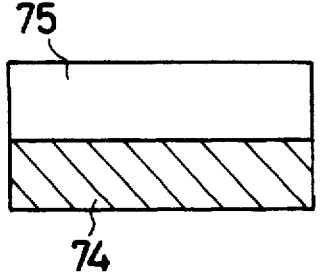
Figure 25:
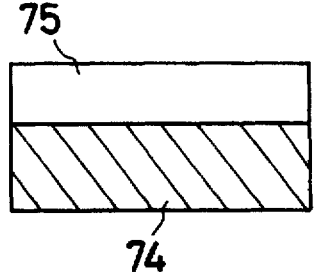
Figure 25:
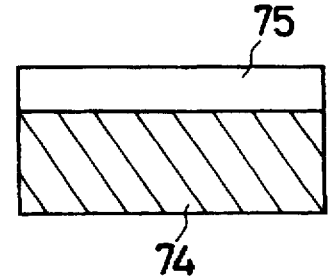

In the case shown in FIGS. 25(a) and (b), a Lippmann hologram 74 is obtained, as is the case with FIGS. 24(a) and (b). As shown in FIGS. 25(c1)–(c3), swelling film 75 obtained by mixing a monomer or oligomer, a photopolymerization initiator, etc., with a binder polymer is exposed to a given quantity of light 76, whereby a part, or the whole, of the active, permeable monomer or oligomer therein is inactivated at a proportion corresponding to the quantity of light 76, and so loses permeability (diffusing power). As shown in FIGS. 25(d1)–(d3), the swelling film 75 exposed to light 76 is brought in close contact with the hologram 74. Upon heating as in the case with FIG. 24, the degree of swelling of the hologram 74 varies with the quantity of light 76. Thus, it is possible to control the color to be reconstructed between red and blue by regulating the quantity of light 76 exposed to the swelling film 75.

As mentioned above, the swelling film 75 is prepared by mixing a monomer or oligomer, a photopolymerization initiator, etc., with a binder polymer, and is similar to a photopolymer for holographic recording. Consequently, it is not always necessary to prepare such swelling film specially. In other words, the photopolymer for holographic recording may be used as the swelling film 75.

In terms of the color to be reconstructed, the hologram 7 may be varied depending on the quantity of light that illuminates the swelling film 75, as mentioned above. Consequently, the color (wavelength) reconstructed is allowed to have a spatial distribution by permitting the intensity of light 76 to have a spatial distribution. This will now be explained with reference to FIGS. 26(a)–(b) and (c1)–(c3). As shown in FIG. 26(a), swelling film 75 such as the above-mentioned one is brought into contact with a Lippmann hologram 74 with interference fringes recorded on it, and then exposed to light 76 through a mask with a continuously varying transmittance. Upon heated, the region exposed to a large amount of light is hardly swollen for the same reason as mentioned above, but the region exposed to a smaller amount of light is largely swollen, as shown in FIG. 26(b). Consequently, blue light having short wavelength is diffracted by a region of the hologram 74 that is exposed to a large quantity of light, while red light having long wavelength is diffracted by a region of the hologram 74 that is little irradiated with light. Here consider the case where a Lippmann hologram 74 recorded at a wavelength of B (500 nm) is irradiated with light through a mask with the transmittance changing continuously from 100% to 0% (FIG. 26(a)). Light with a spectral distribution having a peak at B (500 nm) is diffracted by a region (1) substantially corresponding to an about 100% transmittance, as can be seen from a graph 1 in FIG. 26(c1), and this appears blue. Light with a spectral distribution having a peak at R (600 nm) is diffracted by a region (3) corresponding to an about 0% transmittance, and this appears red. Light with a spectral distribution having a peak at G (550 nm) is diffracted by a region (2) corresponding to an about 50% transmittance, and this appears green. In Graphs (1)–(3) in FIGS. 26(c)–(c3), the abscissas λ stand for wavelength and the ordinates r represent reflectivity (the rate of diffraction). Even with the process shown in FIG. 25, the hologram 74 can be reconstructed, as is the case with the process shown in FIG. 24.

Figure 27A:
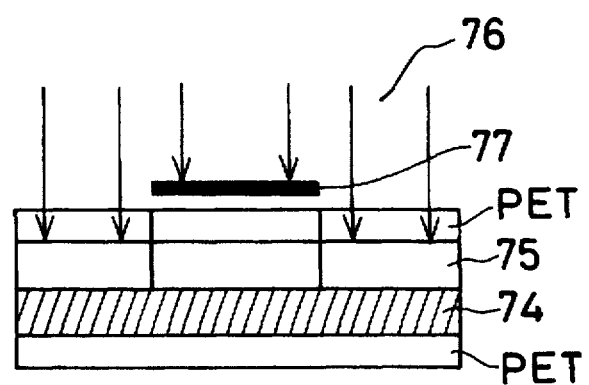
FIGS. 27(a)–(b) comprise a schematic illustrating how to reconstruct color by means of additive mixture.

While the invention has been described with reference to the examples where any desired color can be reconstructed with a single wavelength, it is understood that, according to the invention, any desired color can be reconstructed by dot additive mixture techniques. As shown in FIG. 27(a), swelling film 75 is brought in close contact with a Lippmann hologram 74 with interference recorded on it, and then exposed to light 76 through a dot sheet 77. Upon heated, the unexposed region is largely swollen for the same reason as mentioned above, but the exposed region is little swollen. Consequently, blue light of short wavelength is diffracted by the exposed region of the hologram 74, while red light of long wavelength is diffracted by the unexposed region. Here, too, the hologram 74 can be reconstructed in the manner mentioned above.

As illustrated in FIG. 27(a), dot size is reduced to change dot percent, whereby colors ranging from blue to red are obtained by an additive mixture technique for blue and red. FIGS. 28(a) and (b1)–(b3) represent reflectivities (rates of diffraction) r corresponding to wavelengths λ from regions (1), (2) and (3), having dot percents of 100%, 50% and 0%, respectively, of a hologram 74 which, as shown in FIGS.

27(a)–(b), was irradiated with light through a dot sheet with a dot percent varying continuously from 0% to 100% and then swollen with the use of swelling film 75. For instance, now consider the case where a Lippmann hologram 74 is recorded at a wavelength of B (500 nm) and light of wavelength R (600 nm) is diffracted at the location exposed to light 76 after swelling. At the 100% dot percent region (1) the reconstructed color spectrum has a distribution as represented by Graph (1) (FIG. 28(b1), and appears red. At the 0% dot percent region (3) the reconstructed color spectrum has a distribution as represented by Graph (3) (FIG. 28(b3), and appears blue, while at the 50% dot percent region (2) the reconstructed color spectrum has a distribution as represented by Graph (2) (FIG. 28(b2), and appears green G due to the additive mixture principle and depending on in what proportion blue B and red R are.

Figure 27B:
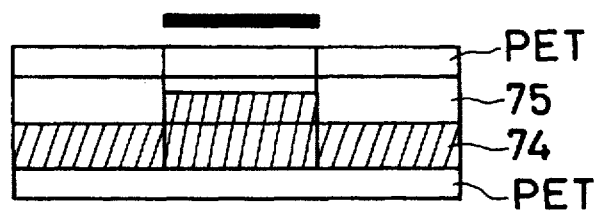

With the use of the processes explained in connection with FIGS. 26 and 27–28, a color image can be additionally written on the hologram. For instance, consider the case shown in FIG. 29, where a mask with an image drawn on it depending on a transmittance distribution is used with a region (a) having a 100% transmittance, (b) 0% and (c) 50%. With the use of the process shown in FIG. 26, it is then possible to apply blue, red and green to a hologram 74 on which a uniform phase volume type of diffraction grating is recorded by way of example. Then, consider the case shown in FIG. 30 where a dot mask with an image drawn depending on a dot percent distribution is used with a region (a) having a 100% dot percent, (b) 0% and (c) 50%. With the use of the process explained with reference to FIGS. 29 and 30, it is then possible to apply red, blue and green to a hologram 74 on which a uniform phase volume type of diffracting grating is recorded by way of example.

The processes for controlling reconstruction wavelengths using such swelling film as mentioned above are applicable to preparing pseudo color patterns and preventing forgery and falsification, to say nothing of regulating the reconstruction wavelength of Lippmann holograms to a wavelength different from the recording one. Especially when such swelling film is exposed to illumination light having a predetermined spatial distribution to impart a spatial degree-of-swelling distribution according to numbers, letters, codes, patterns, etc., to a part of a Lippmann hologram, it is virtually impossible to make a copy of the original. This is because, although the additionally written numbers, letters, codes, patterns, etc., can be identified by the contours of the portions having varying reconstruction wavelengths, the portion with such additionally written information is so different in wavelength from the remaining portions that it can remain unchanged. In addition, since the hologram information and the additionally written information are formed by the same continuous interference fringes, the erasure or addition of the additionally written information causes the hologram information to have some defects, and so is immediately found to be a forgery, making the prevention of forgery or falsification possible.

In the ensuing description, the swelling film, how to process holograms with the use of it, and illustrative examples of the holograms will now be explained more specifically but not exclusively.

ILLUSTRATIVE EXAMPLE 1

The following ingredients were provided.

| | |
|---|---|
| Binder polymer: Vinac B-100 (polyvinyl acetate) | 66.00 wt % |
| (Acrylic) monomer: Photomer 4039 (phenol ethoxylate mono-acrylate) | 17.00 wt % |
| Sartomer 349 (ethoxylated bisphenol A diacrylate) | 3.00 wt % |
| Plasticizer: 4G7 (tetraethylene glycol diheptanoate) | 10.22 wt % |
| Photopolymerization initiator: | |
| O-chloro HABI (1,1'-biimidazole, 2,2'-bis[o-chlorophenyl]-4,4', 5,5'-tetraphenyl) | 3.70 wt % |
| Sensitizer: JAW (cyclopentanone, 2,5-bis[(2,3,6,7-tetrahydro-1H, 5H-benzo[i,j]quinolizine-1-yl)methylene]-) | 0.08 wt % |

The composition made up of the above ingredients was dissolved in 97 wt % of dichloromethane and 3 wt % of 2-propanol (having a total solute content of 22 wt %), and the obtained solution was used to prepare film by the following procedures.

A sensitizer-free coating solution was stirred until it was perfectly dissolved, and the ingredients were added to the solvent while they were mixed together. Following this, the sensitizer was added to the solution. This step and the next step of coating the mixed solution to film were all conducted under red light.

The thus obtained solution (photographic photosensitive agent) was coated on a 50 μm thick transparent film substrate of polyethylene terephthalate (PET) by means of a gravure coater having a plate depth of 150 μm. Following this, a 5 μm thick transparent film of polyethylene terephthalate was laminated on the film coming from a drying zone to obtain a photosensitive swelling film. In this example, this film was also used as a photopolymer.

ILLUSTRATIVE EXAMPLE 2

With the use of blue light having a wavelength of 514 nm, emitted from an argon ion laser, object light 2 and reference light 3 were caused to strike on the photopolymer having high sensitivity to blue, obtained in Example 1, as illustrated in FIG. 24(a), for recording interference fringes for a Lippmann hologram designed to reconstruct blue color. Following this, 1 the medium was irradiated with 50-mJ ultraviolet rays to fix the monomer in the photosensitive material, thereby obtaining a Lippmann hologram.

Then, the photosensitive swelling film obtained in Example 1 was laminated on the Lippmann hologram. Using a halogen lamp found to be 9.0 mW/cm$^2$ as measured at 514 nm as an irradiation light source, the irradiation time was regulated, as shown in the following table, thereby varying exposure.

| Irradiation Time in seconds | Exposure at 514 nm, in mJ |
|---|---|
| 0 | 0 |
| 10 | 90 |
| 20 | 180 |
| 30 | 270 |
| 40 | 360 |
| 50 | 450 |
| 60 | 540 |
| 100 | 1080 |

Then, the medium was treated in an atmosphere of 120° C. prevailing in a circulation type oven to cause the permeable monomer in the photosensitive swelling film to migrate in the interference fringes of the hologram, thereby swelling the interference fringes and so making their spacings wide.

Figure 31:
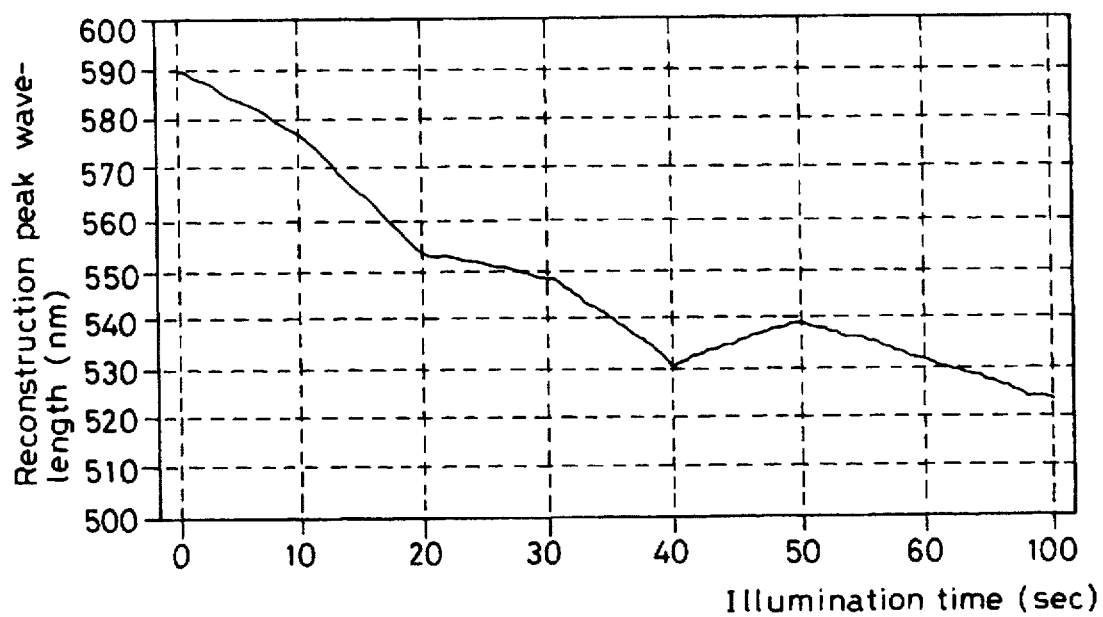
FIG. 31 is a schematic that provides an illustration of how the reconstructed wavelength peaks change in dependence on irradiation time vs. swelling film.

Following this, the medium was illuminated with 100-mJ ultraviolet light to fix the monomer within the interference fringes. As a result, it was found that reconstruction peak wavelengths were obtained with respect to all diffraction wavelengths and colors in the range of about 500 nm to about 600 nm, i.e., blue to red, depending on the irradiation time (exposure), as shown in FIG. 31.

ILLUSTRATIVE EXAMPLE 3

Using blue light having a wavelength of 514 nm, emitted from an argon laser, object light 72 and reference light 73 were allowed to strike on the photopolymer film having high sensitivity to blue, obtained in Example 1, as shown in FIG. 24(a), for recording a volume phase type of diffraction grating built up of uniform interference fringes. Following this, the medium was irradiated with 50-mJ ultraviolet light to fix the monomer in the photosensitive material, thereby obtaining a volume phase type of diffraction grating.

Figure 29:
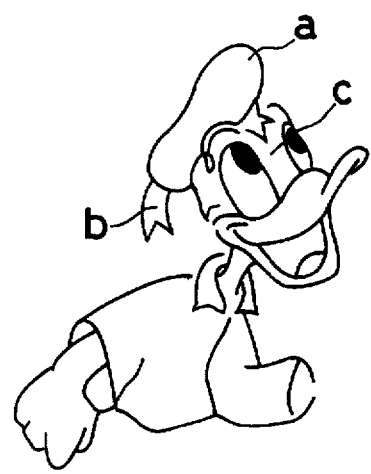
FIG. 29 is a schematic illustrating an example of a mask with an image drawn in terms of a transmittance distribution.

Then, the photosensitive swelling film obtained in Example 1 was laminated on the volume phase type of diffraction grating. While a photomask that was patterned with a continuously varying transmittance, as shown in FIG. 29, was brought into close contact with the swelling film, the medium was irradiated with light coming from the light source used in Example 2 for 1 minute, whereby, as was the case with Example 2, the permeable monomer was caused to migrate in the interference fringes of the diffraction grating, thereby making their spacings wide.

Then, the medium was illuminated with 100-mJ ultraviolet light to fix the monomer in the interference fringes. As a result, the spectrum of the color reconstructed at the portion (a) in FIG. 29 was as represented by Graph (1) in FIG. 26(c1), and the color observed was blue; the spectrum of the color reconstructed at the portion (b) in FIG. 29 was as represented by Graph (3) in FIG. 26(c3), and the color observed was red; and the spectrum of the color reconstructed at the portion (c) in FIG. 29 was as represented by Graph (2) in FIG. 26(c2), and the color observed was green. In other words, a color image could be formed on the uniform volume phase type of diffraction grating that diffracted blue wavelength.

ILLUSTRATIVE EXAMPLE 4

Following Example 3, a volume phase type of diffraction grating built up of uniform interference fringes was obtained.

Figure 30:
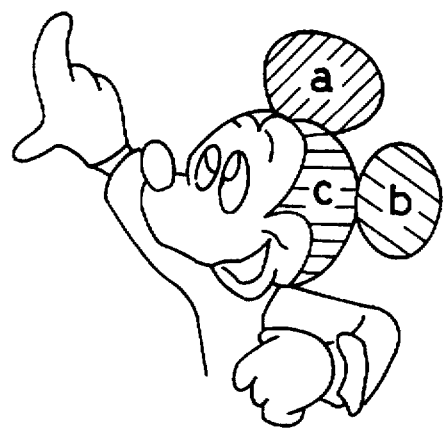
FIG. 30 is a schematic illustrating an example of a mask with an image drawn in terms of a dot percent distribution.

Then, the photosensitive swelling film obtained in Example 1 was laminated on the volume phase type of diffraction grating. While a photomask that was patterned with a continuously varying dot percent, as shown in FIG. 30, was brought into close contact with the swelling film, the medium was irradiated with light coming from the light source used in Example 2 for 1 minute, whereby, as was the case with Example 2, the permeable monomer was caused to migrate in the interference fringes of the diffraction grating, thereby making their spacings wide.

Then, the medium was illuminated with 100-mJ ultraviolet light to fix the monomer in the interference fringes. As a result, the spectrum of the color reconstructed at the portion (a) in FIG. 30 was as represented by Graph (1) in FIG. 28(b1), and the color observed was red; the spectrum of the color reconstructed at the portion (b) in FIG. 30 was as represented by Graph (3) in FIG. 28(c3), and the color observed was blue; and the spectrum of the color reconstructed at the portion (c) in FIG. 30 was as represented by Graph (2) in FIG. 28(b2), and the color observed was green due to the principle of additive mixture of blue wavelength (B) and red wavelength (R). In other words, a color image could be formed on the uniform volume phase type of diffraction grating that diffracted blue wavelength.

It is understood that the method for processing the Lippmann hologram explained with reference to FIGS. 22 to 31 is applicable not only to a Lippmann hologram forming a multiplex information-recorded medium but also to an independent Lippmann hologram.

While the information-recorded media in accordance with the invention and the method for reading the information have been described with reference to some examples, it is understood that invention is not limited to those examples and so may be variously modified. For instance, the block layer may be located on the upper (surface) side, rather than the lower side, of the hologram-recorded layer.

According to the information-recorded medium of the invention and the method for reading the information where, as can be understood from the foregoing, information is recorded on a hologram that is difficult to forge, or this is utilized for reading the information recorded on the printed layer, whether the medium is true or not is easily discerned; in other words, it is difficult to forge or falsify. When information is recorded on the hologram, the information can be recorded on both the hologram-recorded layer and the printed layer in a multiplexed manner. Thus, not only is it possible to increase the amount of information recorded considerably, but it is possible to give much more enhanced security against cards, etc., by correlating both the layers with each other.

What we claim is:

1. An information-recorded medium which includes a layer with a hologram recorded thereon that is composed of a hologram having interference fringes recorded in a transmittance profile or refractive index profile form in a thickness direction of the optical recording material, wherein spacings between interference fringes are made wide or narrow in a portion or portions of the hologram so as to conform to additionally written information, thereby making a wavelength reconstructed by the resultant portion different from that of another portion of the hologram.

2. An information-recorded medium according to claim 1, wherein said hologram-recorded layer comprises a photopolymer, and the spacings between interference fringes are made wide in the portion of the hologram by the swelling of a permeable monomer or oligomer.

3. An information-recorded medium according to claim 2, wherein the degree of swelling has a spatial distribution.

4. An information-recorded medium according to claim 3, wherein said distribution of the degree of swelling is a spatially continuous distribution.

5. An information-recorded medium according to claim 3, wherein said distribution of the degree of swelling is a spatial binary distribution.

6. A medium having information recorded thereon, comprising a first layer with a hologram or a diffraction grating recorded thereon and a second layer with information recorded thereon by printing, each layer having at least an information recorded thereon, wherein the first layer comprises a shielding layer;

a hologram or diffraction grating is recorded on the first layer;

the first layer is deposited above the second layer, the first layer reflects visible light and transmits invisible light;

the second layer has a component to reflect or absorb invisible light; and the information on the second layer is shielded by the first layer under visible light and can be read through the first layer under invisible light without interfering with reading of the first layer.

7. A medium having information recorded thereon according to claim 6, wherein the medium is laminated in the order of base material/second layer/first layer.

8. A medium having information recorded thereon according to claim 6, wherein the first layer contains a relief hologram or a relief pattern of diffraction grating.

9. A medium having information recorded thereon according to claim 8, wherein a continuous reflection layer is formed on the relief pattern.

10. A medium having information recorded thereon according to claim 9, wherein said reflection layer is a semi-transparent reflection layer.

11. A medium having information recorded thereon according to claim 10, wherein said reflection layer comprises a continuous film layer having a refractive index different from that of the material where said relief pattern is formed.

12. A medium having information recorded thereon according to claim 9, wherein said reflection layer transmits invisible light and reflects visible light.

13. A medium having information recorded thereon according to claim 12, wherein said reflection layer reflects light having wavelength other than the wavelength for reading the information recorded on the second layer.

14. A medium having information recorded thereon according to claim 8, wherein the first layer shielding layer is on the second layer of hologram or diffraction grating, and said shielding layer transmits invisible light and does not transmit visible light.

15. A medium having information recorded thereon according to claim 6, wherein the first layer contains a Lippmann hologram.

16. A medium having information recorded thereon according to claim 15, wherein a continuous reflection layer is formed on the surface of said Lippmann hologram facing to the second layer.

17. A medium having information recorded thereon according to claim 16, wherein said reflection layer comprises a semi-transmitting reflection layer.

18. A medium having information recorded thereon according to claim 15, wherein the first layer shielding layer is on the Lippmann hologram facing to the second layer, said shielding layer transmits invisible light, but not visible light.

19. A medium having information recorded thereon according to claim 6, wherein the first layer comprises a Lippmann hologram, a relief hologram or a relief diffraction grating.

20. A medium having information recorded thereon according to claim 19, wherein the first layer shielding layer is on the hologram or the diffraction grating facing to the second layer, and said shielding layer transmits invisible light, but not visible light.

21. A medium having information recorded thereon according to claim 6, wherein said invisible light is infrared light.

22. A medium having information recorded thereon according to claim 6, wherein said invisible light is ultraviolet light.

* * * * *